US012367693B2

(12) United States Patent
Silva Sousa et al.

(10) Patent No.: US 12,367,693 B2
(45) Date of Patent: *Jul. 22, 2025

(54) MESSAGING SYSTEM FOR ENGAGEMENT ANALYSIS BASED ON LABELS

(71) Applicant: Snap Inc., Santa Monica, CA (US)

(72) Inventors: Vítor Silva Sousa, Los Angeles, CA (US); Nils Murrugarra-Llerena, Los Angeles, CA (US); Leonardo Ribas Machado das Neves, Marina del Rey, CA (US); Neil Shah, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,245

(22) Filed: Oct. 10, 2023

(65) Prior Publication Data

US 2024/0046674 A1 Feb. 8, 2024

Related U.S. Application Data

(63) Continuation of application No. 17/248,400, filed on Jan. 22, 2021, now Pat. No. 11,816,906.

(Continued)

(51) Int. Cl.
*G06V 20/70* (2022.01)
*G06F 16/58* (2019.01)
(Continued)

(52) U.S. Cl.
CPC .......... *G06V 20/70* (2022.01); *G06F 16/5866* (2019.01); *G06F 18/214* (2023.01);
(Continued)

(58) Field of Classification Search
None
See application file for complete search history.

(56) References Cited

U.S. PATENT DOCUMENTS 5,884,037 A    3/1999 Aras et al.
9,940,576 B1 *  4/2018 Dey ..................... G06Q 50/01
(Continued)

FOREIGN PATENT DOCUMENTS

CN    109074553    12/2018
CN    110537176    12/2019
(Continued)

OTHER PUBLICATIONS

Idrais, Jaafar, Yassine El Moudene, and Abderrahim Sabour. "Online Social Networks: Study and validation of the regular behaviors of a targeted community on a complex network using a time series approach." 2019 4th World Conference on Complex Systems (WCCS). IEEE, 2019. (Year: 2019).*

(Continued)

*Primary Examiner* — Michelle M Entezari Hausmann
(74) *Attorney, Agent, or Firm* — Schwegman Lundberg & Woessner, P.A.

(57) ABSTRACT

A messaging system performs engagement analysis based on labels associated with content items produced by users of the messaging system. The messaging system is configured to process content items comprising images to identify elements in the images and determine labels for the images based on conditions indicating when to associate a label of the labels with an image of the images based on the elements in the image. The messaging system is further configured to associate the label with the content item, in response to determining to associate the label with the image, associating the label with the content item. The messaging system is further configured to determine engagement scores for the label based on interactions of users with the content items associated with label and adjust the engagement scores to determine trends in the labels to generate adjusted engagement scores.

20 Claims, 34 Drawing Sheets

Related U.S. Application Data

(60) Provisional application No. 63/132,916, filed on Dec. 31, 2020.

(51) Int. Cl.
  *G06F 18/214* (2023.01)
  *G06F 18/2431* (2023.01)
  *G06N 3/04* (2023.01)
  *G06N 3/08* (2023.01)
  *H04L 51/10* (2022.01)

(52) U.S. Cl.
  CPC ........... *G06F 18/2431* (2023.01); *G06N 3/08* (2013.01); *G06N 3/04* (2013.01); *G06V 2201/10* (2022.01); *H04L 51/10* (2013.01)

(56) References Cited

U.S. PATENT DOCUMENTS

| | | | |
|---|---|---|---|
| 10,489,447 B2* | 11/2019 | Chen | G06N 5/04 |
| 10,515,379 B2 | 12/2019 | Gupta et al. | |
| 10,750,245 B1 | 8/2020 | Zeiler et al. | |
| 10,867,321 B1 | 12/2020 | Macdonald-korth et al. | |
| 10,997,257 B2 | 5/2021 | Stoyanov et al. | |
| 11,269,968 B1* | 3/2022 | Gandhi | G06F 16/958 |
| 11,373,252 B1* | 6/2022 | Moses | G06Q 10/04 |
| 11,463,533 B1 | 10/2022 | Garber | |
| 11,587,172 B1 | 2/2023 | Guzman et al. | |
| 11,816,906 B2 | 11/2023 | Silva Sousa et al. | |
| 11,893,720 B1* | 2/2024 | Dutta Choudhury | G06V 20/20 |
| 12,079,304 B1* | 9/2024 | Mishra | G06Q 10/04 |
| 2008/0201348 A1 | 8/2008 | Edmonds et al. | |
| 2010/0063870 A1 | 3/2010 | Anderson et al. | |
| 2012/0254152 A1* | 10/2012 | Park | G06Q 30/0201 |
| | | | 707/E17.109 |
| 2016/0019271 A1* | 1/2016 | Ma | G06F 16/955 |
| | | | 707/756 |
| 2016/0274764 A1 | 9/2016 | Moreau et al. | |
| 2016/0334972 A1* | 11/2016 | Cheng | G06T 11/60 |
| 2018/0046637 A1 | 2/2018 | Koopman et al. | |
| 2018/0084310 A1 | 3/2018 | Katz et al. | |
| 2018/0174160 A1 | 6/2018 | Gupta et al. | |
| 2018/0174190 A1 | 6/2018 | Ferreira et al. | |
| 2019/0026786 A1 | 1/2019 | Khoury et al. | |
| 2019/0073098 A1 | 3/2019 | Fu | |
| 2019/0130293 A1 | 5/2019 | Singh et al. | |
| 2020/0034857 A1* | 1/2020 | Choi | G06F 16/638 |
| 2020/0110754 A1 | 4/2020 | Lamburt et al. | |
| 2020/0272657 A1 | 8/2020 | Gardner et al. | |
| 2020/0387797 A1 | 12/2020 | Ryan et al. | |
| 2020/0387995 A1* | 12/2020 | Bucciarelli | H04W 4/14 |
| 2020/0394360 A1 | 12/2020 | Dunn et al. | |
| 2021/0060404 A1 | 3/2021 | Wanke et al. | |
| 2021/0064983 A1 | 3/2021 | Mai et al. | |
| 2021/0126883 A1* | 4/2021 | Choi | G06F 3/0484 |
| 2022/0207080 A1 | 6/2022 | Silva Sousa et al. | |
| 2022/0295150 A1 | 9/2022 | Ruggeri Cons et al. | |
| 2023/0306515 A1* | 9/2023 | Styles | G06Q 40/06 |
| 2024/0152798 A1* | 5/2024 | Karpovsky | G06N 20/10 |

FOREIGN PATENT DOCUMENTS

| | | |
|---|---|---|
| CN | 116710911 A | 9/2023 |
| WO | WO-2022146774 A1 | 7/2022 |

OTHER PUBLICATIONS

"U.S. Appl. No. 17/248,400, Examiner Interview Summary mailed May 24, 2023", 3 pgs.

"U.S. Appl. No. 17/248,400, Non Final Office Action mailed Feb. 24, 2023", 38 pgs.

"U.S. Appl. No. 17/248,400, Notice of Allowance mailed Jul. 7, 2023", 16 pgs.

"U.S. Appl. No. 17/248,400, Response filed May 8, 2023 to Non Final Office Action mailed Feb. 24, 2023", 13 pgs.

"International Application Serial No. PCT/US2021/064553, International Search Report mailed Mar. 14, 2022", 3 pgs.

"International Application Serial No. PCT/US2021/064553, Written Opinion mailed Mar. 14, 2022", 7 pgs.

"Twitter Trending Hashtags and Topics—Trendsmap", [Online] Retrieved from the Internet: <URL: https://web.archive.org/web/20200401100844/https://www.trendsmap.com/>, (Apr. 1, 2020), 1 pg.

Gordon, Steven, "Google Trends: A Metric of Consumer Behavior", Sphere Quantitative Insights, (2017), 4 pgs.

Hendrickson, Scott, et al., "Trend Detection in Social Data", GNIP, Twitter, Inc., [Online] Retrieved from the Internet: <URL: https://developer.twitter.com/content/dam/developer-twitter/pdfs-and-files/Trend-Detection.pdf>, (2015), 19 pgs.

Jaafar, Idrais, et al., "Online Social Networks: Study and validation of the regular behaviors of a targeted community on a complex network using a time series approach", IEEE, 2019 4th World Conference on Complex Systems (WCCS), (2019).

Jun, Woogyoung, et al., "Automatic Image Tagging Model Based on Multigrid Image Segmentation and Object Recognition", Advances in Multimedia, vol. 2014, [Online] Retrieved from the Internet: <URL:https://downloads.hindawi.com/journals/am/2014/857682.pdf> [retrieved on Feb. 28, 2022], (Dec. 22, 2014), 7 pgs.

Lu, Rong, et al., "Trend Analysis of News Topics on Twitter", International Journal of Machine Learning and Computing, 2(3), (Jun. 2012), 327-332.

Mohebbi, Matt, et al., "Google Correlate Whitepaper", [Online] Retrieved from the Internet: <URL: https://static.googleusercontent.com/media/research>, (Jun. 9, 2011), 6 pgs.

Rathod, Tejal, et al., "Trend Analysis on Twitter for Predicting Public Opinion on Ongoing Events", International Journal of Computer Applications (0975-8887), 180(26), (2018), 5 pgs.

"European Application Serial No. 21844156.6, Communication Pursuant to Article 94(3) EPC mailed Oct. 18, 2024", 9 pgs.

"International Application Serial No. PCT/US2021/064553, International Preliminary Report on Patentability mailed Jul. 13, 2023", 9 pgs.

"European Application Serial No. 21844156.6, Summons to Attend Oral Proceedings mailed May 20, 2025", 14 pgs.

"Chinese Application Serial No. 202180088183.5, Office Action mailed May 17, 2025", w/ English Translation, 19 pgs.

* cited by examiner

MESSAGING SYSTEM FOR ENGAGEMENT ANALYSIS BASED ON LABELS

CLAIM OF PRIORITY

This application is a continuation of U.S. patent application Ser. No. 17/248,400, filed on Jan. 22, 2021, which claims the benefit of priority to U.S. Provisional Application Ser. No. 63/132,916, filed on Dec. 31, 2020, which are incorporated herein by reference in their entireties.

TECHNICAL FIELD

Embodiments of the present disclosure relate generally to a messaging system for engagement analysis based on labels of content items. More particularly, but not by way of limitation, embodiments of the present disclosure relate to determining engagement scores based on a trend component, a seasonality component, and a residual component, and based on the determined engagement scores generating new content.

BACKGROUND

Current messaging systems provide the opportunity for users to produce and post content such as images and video. The content is made available in the messaging systems for other users to consume. The users may produce a very large amount of content. For example, there may be millions of images and videos available for users to consume. It may be difficult or time consuming to find content that is currently trending based on labels associated with the content.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
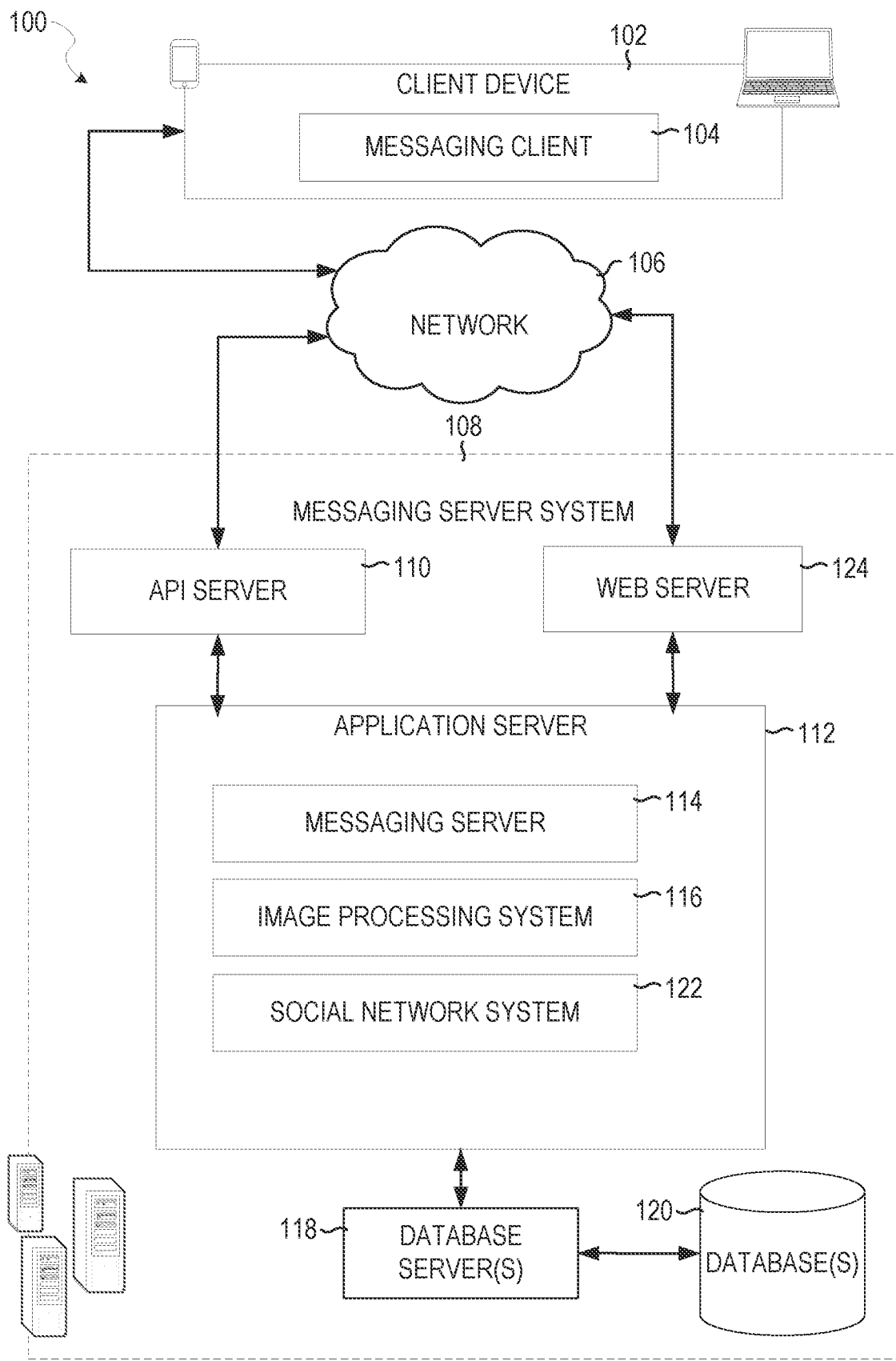
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed is a messaging system that analyzes the engagement of users of the messaging system with visual tags or labels associated with content items that are produced and consumed by users of the messaging system. The messaging system analyzes the users, content items, production of the content items, and consumption of the content items to determine abnormal activity associated with labels or visual tags that are associated with the content items.

Example labels or visual tags include "bird", "cat", "dog", "fishing", "bowling", "indoors", "outdoors", and so forth. The messaging system analyzes the content items and identifies objects or elements within images of the content items. Example objects include "boy", "bowling ball", "bowling alley", "shorts", and so forth. The messaging system determines whether to associate a label with a content item based on the objects or elements identified in the content item. For example, a content item may be an image taken at a bowling alley. The messaging system extracts objects "boy", "bowling ball", "indoors", and "bowling alley." The messaging system then determines which labels to associate with the content item. In some embodiments, the labels are associated with conditions that indicate whether or not a label should be associated with a content item. For example, a label of "bowling" may have conditions that indicate that if objects of "people", "bowling ball", and "indoors" are identified in the image of the content item, then the label "bowling" is to be associated with the content item. There may be many conditions that trigger a label being associated with a content item. A content item may be associated with many labels.

The messaging system then generates engagement scores for labels that indicate how much users of the messaging system have interacted with content items associated with the label. The engagement may be measured using content consumption metrics. Example content consumption metrics include for a content item: viewing, viewing time, a number of shares, a number of screen shots, and a number of shares. One problem is that it may be difficult to determine the engagement of the users with a label with so many content consumption metrics. The solution to this problem is using aggregate content consumption metrics such as passion and popularity. For passion and popularity there is a weight vector associated with each of the content consumption metrics so that a single aggregate engagement score is determined, which may make it easier to analyze the user engagement of a label.

The messaging system adjusts the aggregate engagement scores and the engagement scores. The adjustments make it is easier to determine if the activity associated with a label is abnormally high or low. The messaging system determines a simple moving average in some embodiments. In some embodiments the messaging system determines a trend momentum. In some embodiments the messaging system adjusts the engagement scores in accordance with a dynamic seasonal adjustment or dynamic seasonality adjustment. In some embodiments, the messaging systems adjusts the engagement scores to determine a dynamic seasonality for an interaction of the interactions of the users, where the dynamic seasonality is determined based on an average of subtracting a trend component from values of the interaction.

The messaging system monitors the adjusted engagement scores and may perform actions when the adjusted engagement scores are abnormally high or low for a label. The actions include reporting the abnormal activity and generating augmentation content related to the label that is made available for users of the messaging system to add to their content items.

The messaging system takes the various generated databases regarding the content items and users and generates an aggregated database that removes the personal information of the users in order to ensure the privacy of the users. In some embodiments, the messaging system deletes generated databases that expose the private data of the users. Some embodiments improve the identification of abnormal activity by removing seasonal fluctuations in the engagement scores.

Some embodiments provide a technical solution to the technical problem of identifying abnormal activity within a messaging system that is associated with a label. Some embodiments provide a technical solution to the technical problem of using user profile data of users of a messaging system while maintaining privacy for individual users.

Some embodiments have the advantage of improving content consumption by users of a messaging system by recommending content that has abnormal activity to the users. Some embodiments improve the availability of content on a messaging system by recommending to users of the messaging system to produce content related to labels with abnormal activity. Some embodiments improve the targeting of and price that may be charged for advertisements by targeting advertisements that are related to labels with abnormally high activity and by removing seasonal fluctuations in engagement scores. Some embodiments improve the environment for users to produce messages by using abnormal activity associated with labels to generate modification content such as stickers, captions, and songs that may be added to content items that are related to labels with abnormally high activity.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
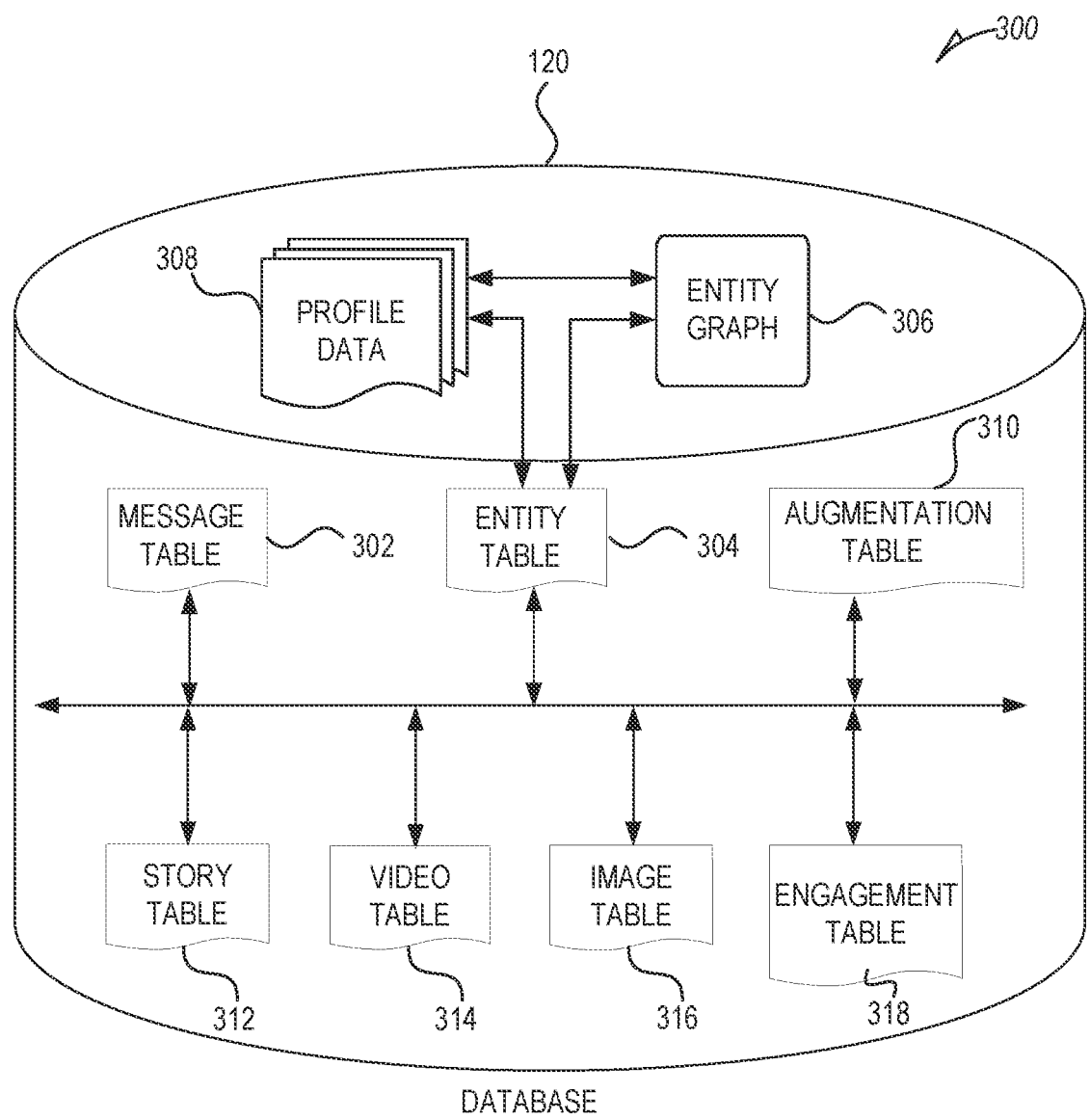
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
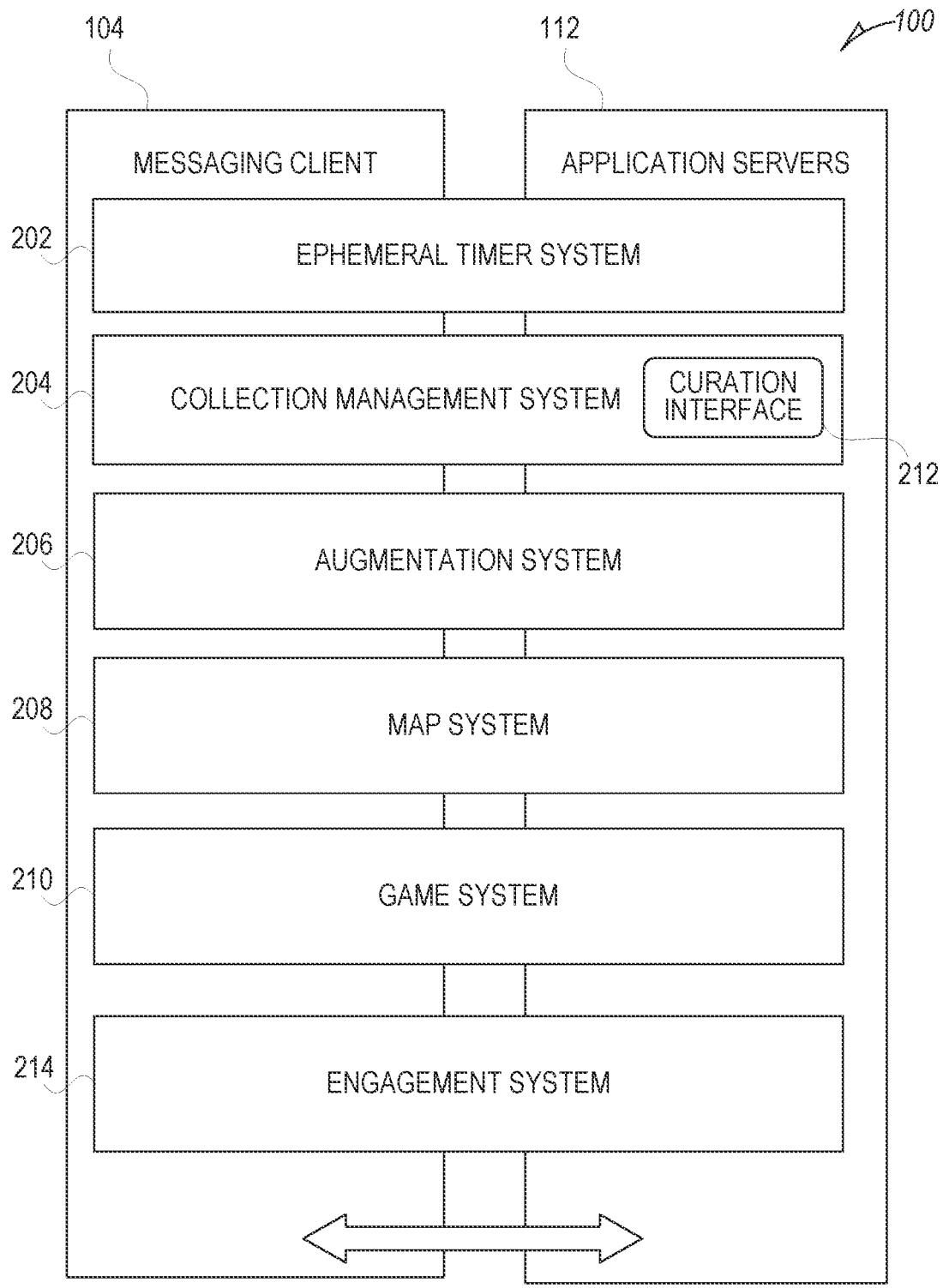
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, a modification system 206, a map system 208, a game system 210, and an engagement system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Figure 6:
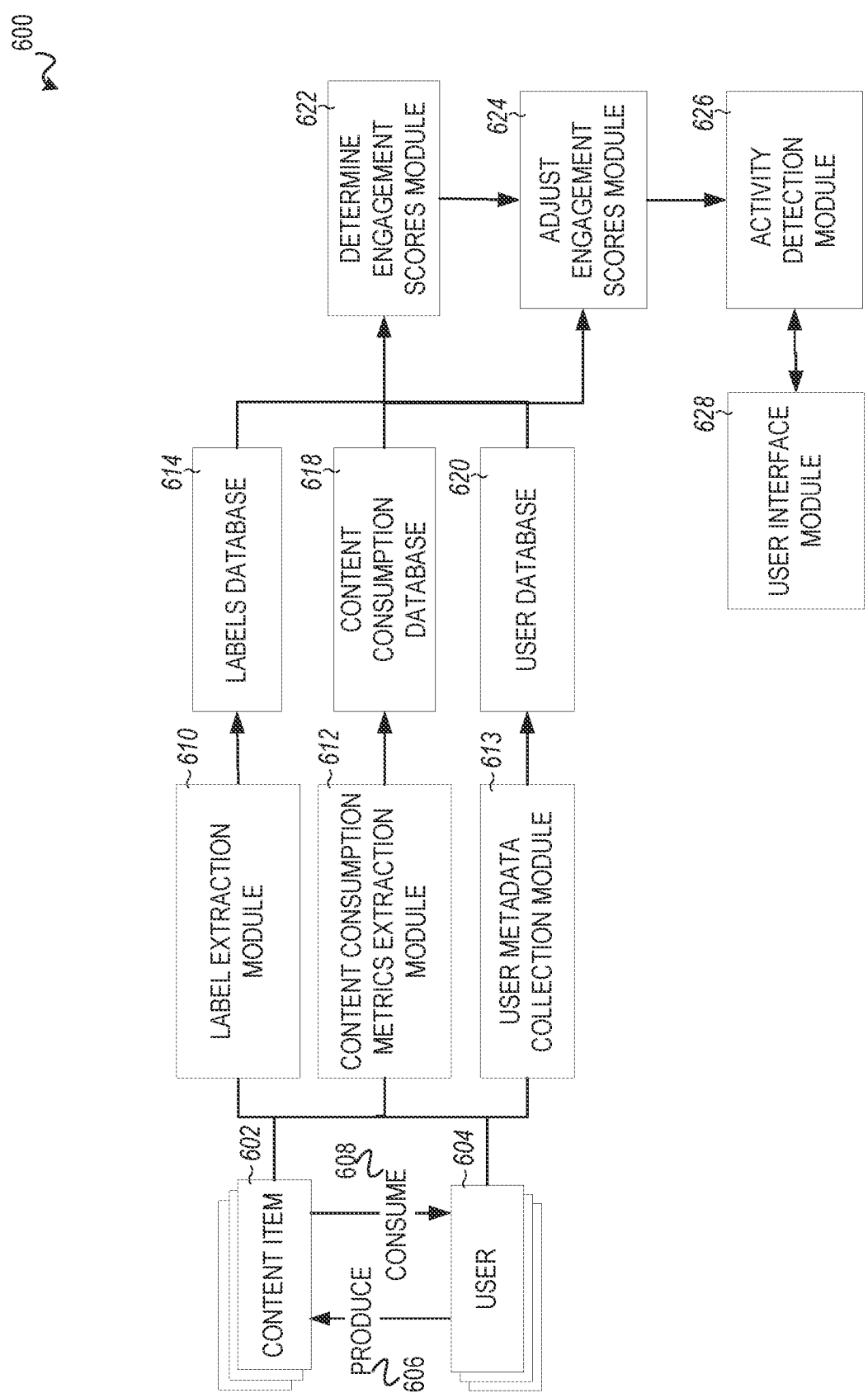
FIG. 6 illustrates a system for engagement analysis based on visual tags, in accordance with some embodiments.

The engagement system 214 provides various functions related to determining engagement scores and supports providing recommendations based on engagement scores to the messaging client 104. The engagement system 214 provides a system to aid in the generation of additional modifications that the augmentation system 206 may provide to the messaging client 104. A modification may be termed an augmentation, in accordance with some embodiments. The engagement system 214 may monitor and determine statistics related to content items generated within the messaging system 100. The engagement system 214 may monitor the activity of the collection management system 204, augmentation system 206, map system 208, and game system 210 as well as other activities of the messaging client 104 and application servers 112 to determine labels associated with content have unusual levels of activity in either being lower than expected or higher than expected. The engagement system 214 may generate recommendations to the messaging client 104 and/or application servers 112 such as which content to display or suggest to users based on labels associated with the content. The engagement system 214 may produce additional content or suggest that content be created that is associated with certain labels. The engagement system 214 may produce reports that may be used for marketing and sales and that may determine which content includes advertisements and to help determine a value for an advertisement. The content is selected based on labels associated with the content and activity levels of engagement by the users with content that is associated with the labels. The engagement system 214 may analyze content and determine external events such as the pandemic from the coronavirus and generate new content to indicate the external events. FIG. 6 provides an overview of the engagement system 214.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database 120 can also store, referring to FIG. 6, labels database 614, content consumption database 618, and user database 620, in an engagement table 318.

Data Communications Architecture

Figure 4:
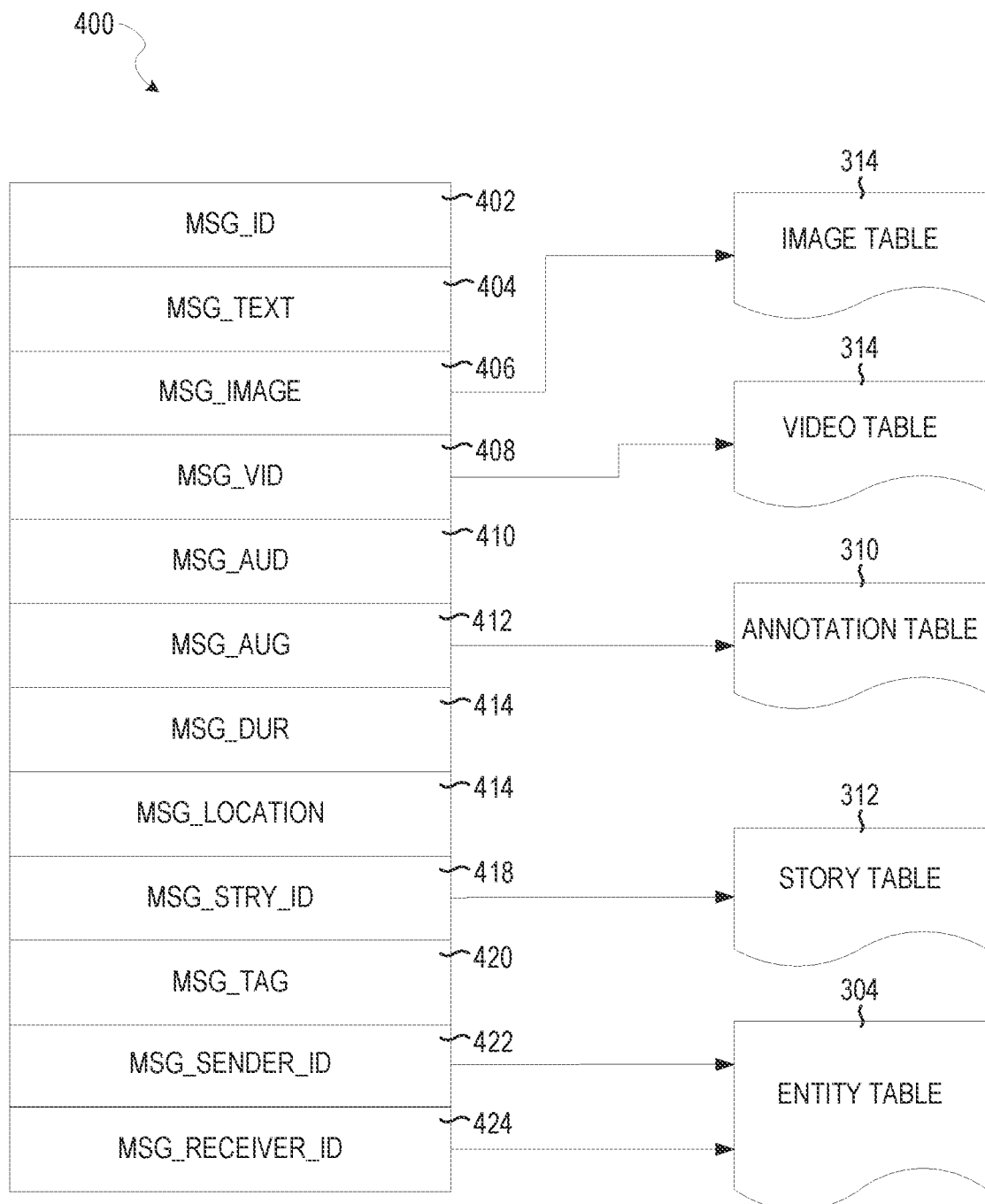
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402: a unique identifier that identifies the message 400. Message text payload 404: text, to be generated by a user via a user interface of the client device 102, and that is included in the message 400.

Message image payload 406: image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414: parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
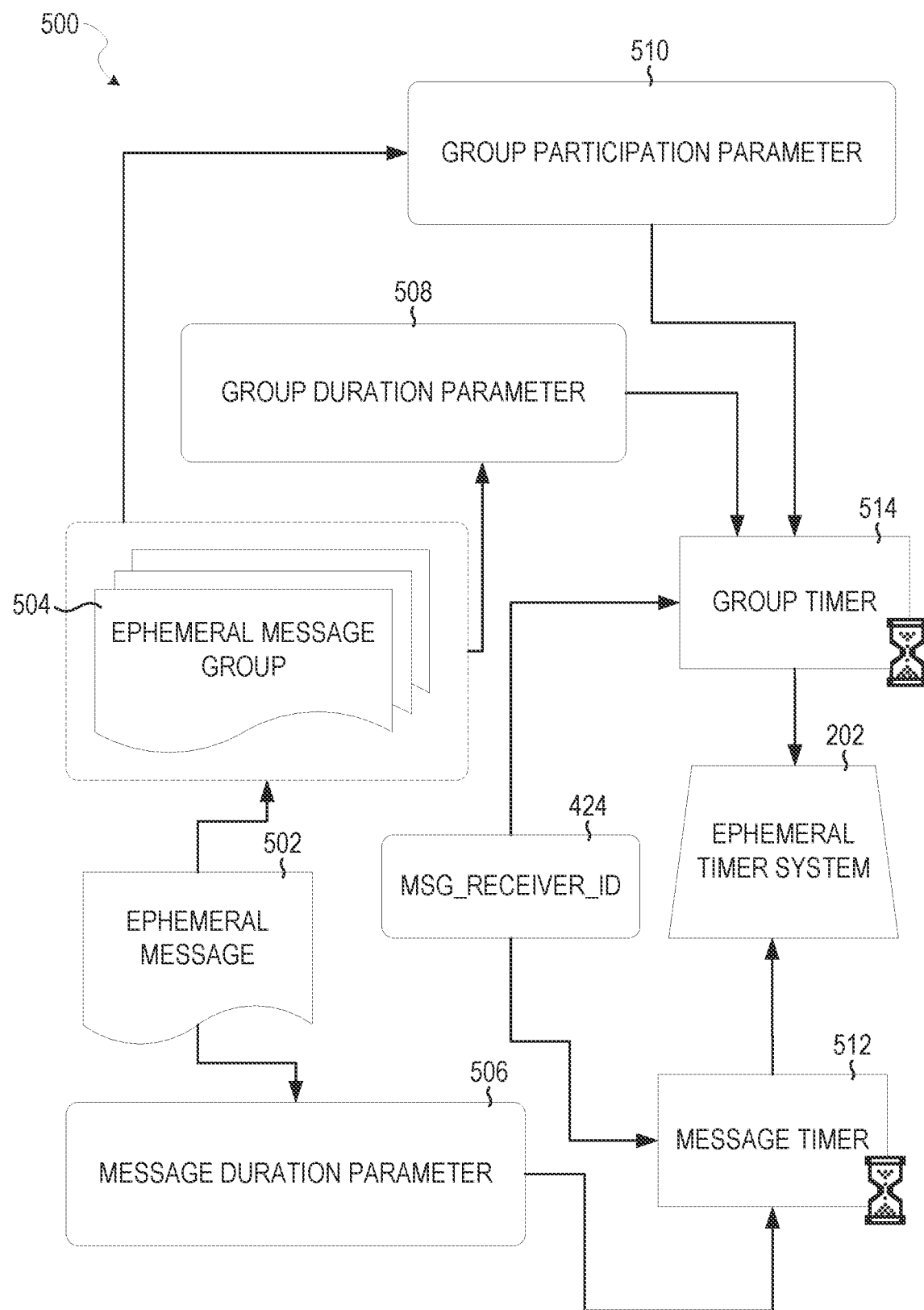
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Engagement Analysis Based on Visual Tags

FIG. 6 illustrates a system 600 for engagement analysis based on visual tags, in accordance with some embodiments. Users 604 produce 606 and consume 608 content items 602 within the messaging system 100 of FIG. 1. For example, the user 604 may be associated with a client device 102 that includes a camera with which the user 604 produces 606 content items 602. Other users 604 of the messaging system 100 may consume 608 the content items 602 and produce 606 their own content items 602.

Figure 7:
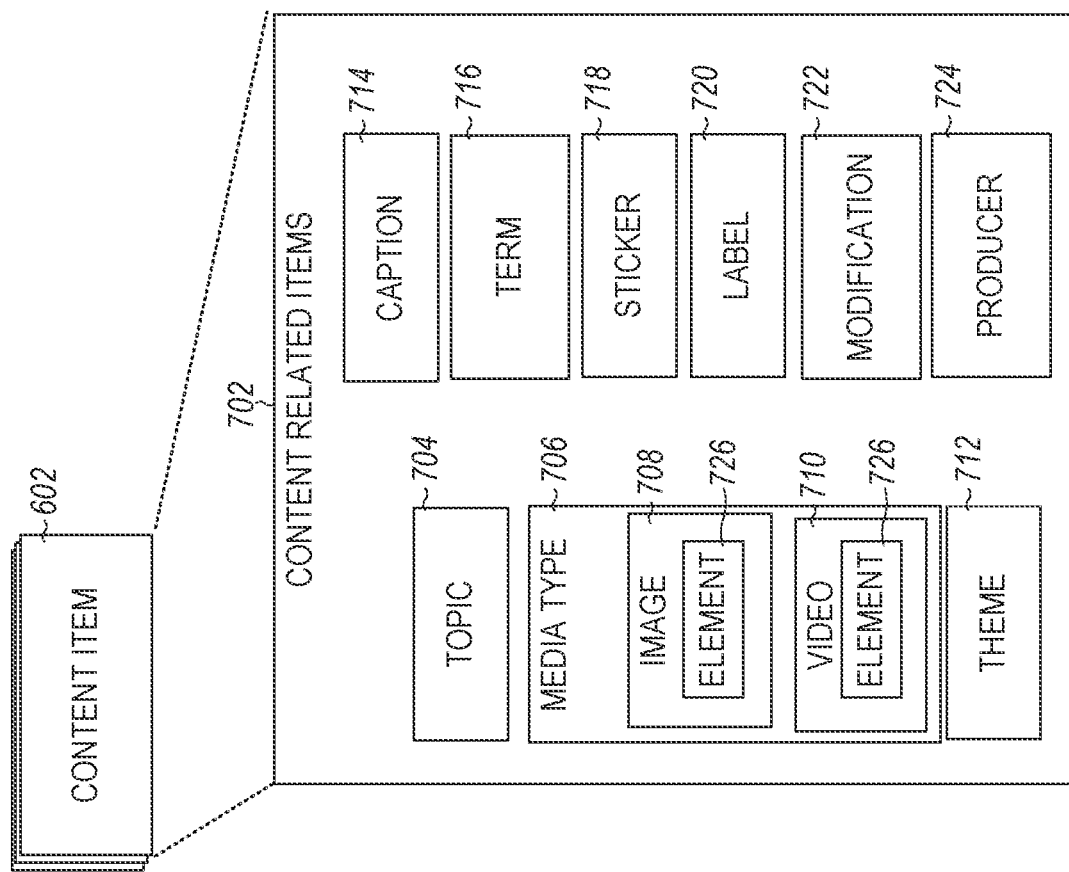
FIG. 7 illustrates content item, in accordance with some embodiments.

The content items 602 are discussed in conjunction with FIG. 7. Users 604 are discussed in conjunction with FIG. 10. The label extraction module 610 determines labels to associate with the content items 602 and builds labels database 614. The labels and the label extraction module 610 are discussed in conjunction with FIG. 9. The user metadata collection module 613 builds the user database 620. The user metadata collection module 613 is discussed in conjunction with FIG. 11.

Content consumption metrics extraction module 612 extracts content consumption metrics from the users 604 producing 606 and consuming 608 content items 602 and builds the content consumption database 618. The content consumption metrics extraction module 612 is discussed in conjunction with FIG. 13.

The determine engagement scores module 622 determines engagement scores of labels and the adjust engagement scores module 624 determines adjusted engagement scores of labels. The activity detection module 626 monitors the adjusted engagement scores and detects adjusted engagement scores of labels that have a lower, higher, or abnormal activity. Determine engagement scores module 622 is disclosed in conjunction with FIG. 14. Adjust engagement scores module 624 and activity detection module 626 are disclosed in conjunction with FIG. 17. The user interface module 628 presents a user interface that presents the results of the activity detection module 626 and provides the user with options to query the system 600. The user interface module 628 is discussed in conjunction with FIG. 30. In some embodiments, the system 600 operates on a real-time basis monitoring the production and consumption of content items 602 and updating the adjusted activity scores of the labels and notifying users via the user interface module 628 of lower, higher, or abnormal activity.

FIG. 7 illustrates content item 602, in accordance with some embodiments. Content item 602 may include content related items 702, topic 704, media type 706, image 708, video 710, theme 712, caption 714, term 716, sticker 718, label 720, modification 722, and producer 724. Topic 704 may be a topic that is determined to be relevant for the content item 602. The topic 704, theme 712, and term 716 may be selected by the user 604 that produced 606 the content item 602 or it may be determined by the system 600. Media type 706 indicates a type of media for the content item 602. Media type 706 includes image 708, video 710, audio, and so forth. Caption 714 is one or more captions that have been added to the content item 602 by the producer 724. Sticker 718 is a modification item that may be added to the content item 602. Label 720 is a name or visual tag that is determined by the system 900. Engagement scores are determined for labels 720 by determine engagement scores module 622 as discussed in conjunction with FIG. 14. Elements 726 are objects, actions, scenes, individuals, places, events, and so forth. Elements 726 are identified by content item analysis module 902 based on element descriptors 918 within the image 708, video 710, audio, and so forth.

In some embodiments, the user 604 that produced 606 the content item 602 may give a label 720 to an object in the content item 602. The modification 722 indicates one or more modification items that have been added to the content item 602 as provided by the augmentation system 206. The modification 722 may include caption 714, sticker 718, and so forth. Producer 724 is the user 604 that produced 606 the content item 602. In some embodiments, the producer 724 may be the messaging system 100. For example, in some embodiments external news stories are generated by the messaging system 100 and made available as content items 602. Content related items 702 may include additional items such as an indication of users 604 that have consumed the content item 602 or a link to copies of the content item 602. In some embodiments, there may be more than one of the fields such as topic 704, term 716, label 720, and so forth.

Figure 8:
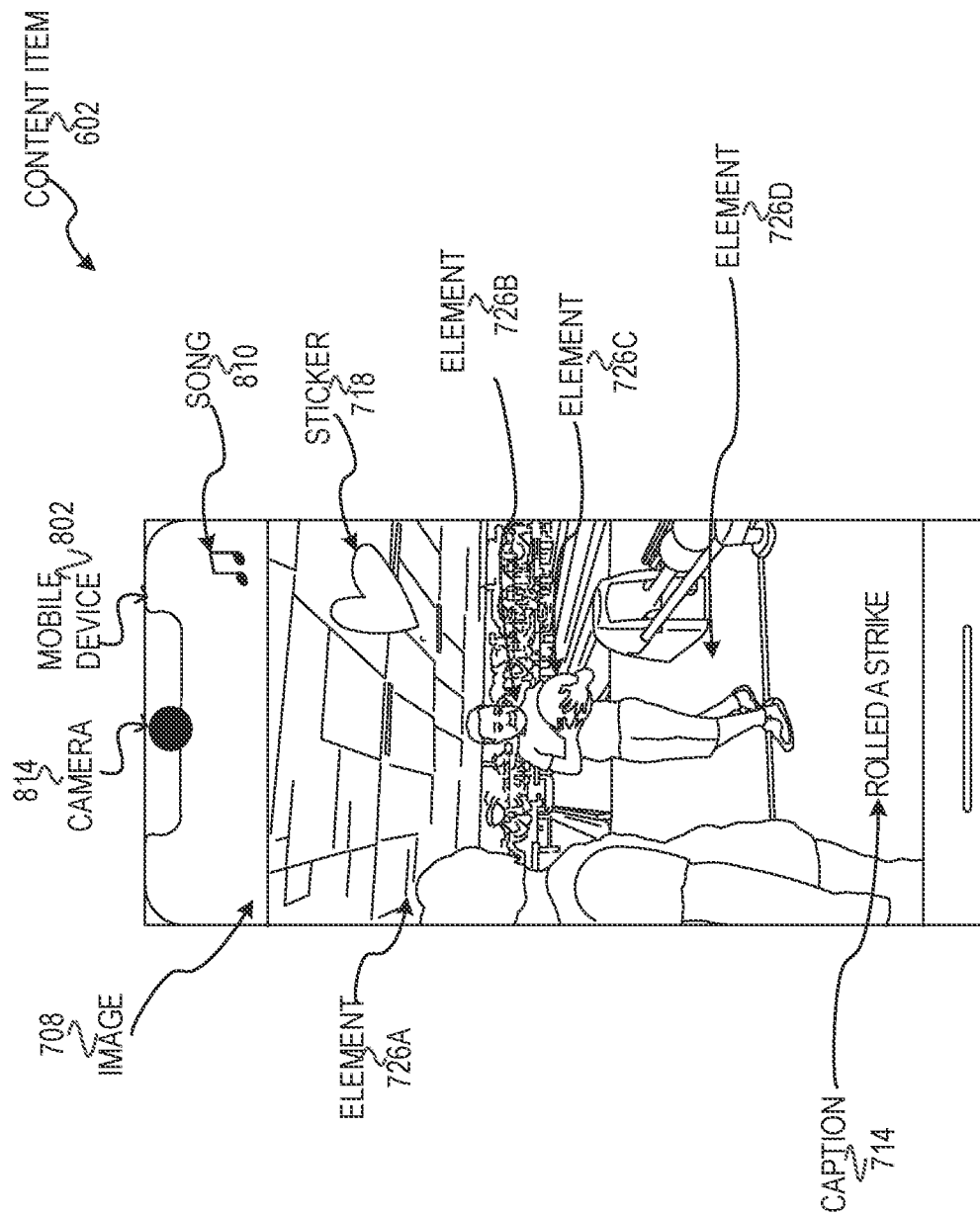
FIG. 8 illustrates content item displayed on a mobile device.

FIG. 8 illustrates content item 602 displayed on a mobile device 802. The mobile device 802 includes a camera 814 which was used to capture the image 708. The mobile device 802 is a client device 102 as discussed in FIG. 1. The mobile device 802 is associated with a user 604. The content item 602 is an image 708 with modifications 722 such as sticker 718 and caption 714, and song 810. Elements 726A, 726B, 726C, and 726D are part of the image 708 and are identified by the content item analysis module 902. Element 726A is a first person or first boy. Element 726B is a second person or second boy. Element 726C is a bowling ball. Element 726D is a bowling lane. Other modifications may be added by the user 604.

Figure 9:
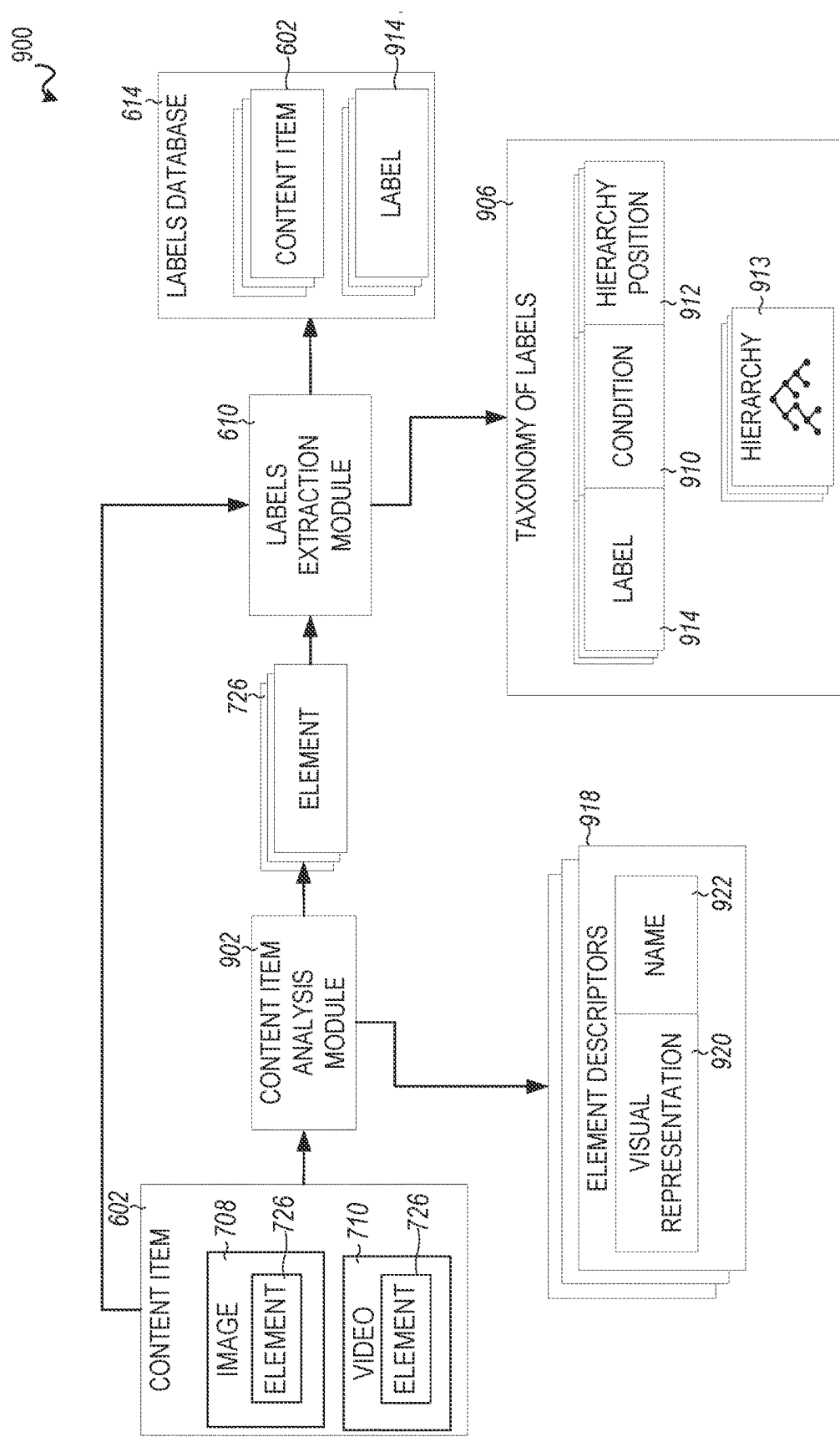
FIG. 9 illustrates a system for determining labels for a content item, in accordance with some embodiments.

In some embodiments the modifications 722 may be modifications that are added by the messaging server system 108 and stored in a manner that enables the modifications 722 to be identified by content item analysis module 902 of FIG. 9 as being associated with the image 708. For example, the content item 602 may have been generated by the augmentation system 206 as part of a message 400 as illustrated in FIG. 4. In some embodiments, the augmentation system 206 enables the user 604 to add modifications 722 to the image 708 such as audio content such as the song 810 or visual content such as the sticker 718 or caption 714, which may be stored in augmentation table 310.

FIG. 9 illustrates a system 900 for determining labels 914 for a content item 602, in accordance with some embodiments. A content item 602 is processed or analyzed by a content item analysis module 902 to determine elements 726 within the image 708, video 710, audio, and so forth. In some embodiments, the content item analysis module 902 is one or more neural networks trained to identify elements 726. For example, one or more convolution neural networks may be used to segment the image 708 or images of the video 710 and identify different elements 726. In some embodiments, the content item analysis module 902 accesses a database of element descriptors 918 where the element descriptors 918 include a visual representation 920 and name 922. The name 922 may be a label or name given to an element 726 in one or more human languages. The visual representation 920 may be a neural network to identify the element 726 or may be another representation such as a vector representation or computer model of the element 726. In some embodiments, the content item analysis module 902 determines elements 726 based on modifications 722. For example, the content item analysis module 902 may identify a sticker 718 as a modification 722 from the augmentation system and determine that the sticker 718 should be classified as an element 726. The determination of whether to classify a modification 722 as an element 726 may depend on the element descriptors 918. For example, the element descriptors 918 may include as a visual representation 920 an indication of a modification 722 and a corresponding name 922 for the modification 722. In the image 708 of FIG. 7, which is an example content item 602, caption 714, song 810, and sticker 718 may all be determined to be elements 726 by the content item analysis module 902 depending on the element descriptors 918. The modifications 722 may not be accessible to the content item analysis module 902 via the augmentation system but may have been incorporated into the image 708. For example, the sticker 718 may be incorporated in the pixels of the image 708 and not be an overlay. The content item analysis module 902 may identify the sticker 718 as a heart based on element descriptors 918 where the visual representation 920 identifies hearts in images.

The content item analysis module 902 generates a list of elements 726 that are part of the image 708 or video 710. The labels extraction module 610 determines labels 914 based on the elements 726, content item 602, and the taxonomy of labels 906. In some embodiments, labels 914 may be termed visual tags when the visual tag is determined for an image 708. The taxonomy of labels 906 includes tuples of label 914, condition 910, and hierarchy position 912. The hierarchy 913 is a hierarch of labels 914. The hierarchy position 912 indicates a position within the hierarchy 913. For example, element 726B is identified as a label 914 of a boy and the hierarchy 913 indicates that a label 914 of a boy has a parent of a label 914 of a person. The hierarchy 913 may indicate a level of abstraction associated with the label 914. For example, the label 914 of boy may have an abstraction level of 3 and its parent with a label 914 of person may have an abstraction level of 2 and a parent of person may have a label 914 of living organisms with an abstraction level of 1. In another example, the image 708 may be further analyzed by content item analysis module 902 to include shorts as an element 726 of the element 726B of the boy. The labels extraction module 610 determines that element 726 of shorts is a label 914 with name shorts. The label 914 shorts has an abstraction level of 3 with clothing having an abstraction level of 2. Other examples of elements 726 of example image 708 are bowling, standing, inside, ceiling, friends, light, and so forth. In some embodiments, the labels extraction module 610 includes parents or ancestors of a label 914 within the hierarchy 913 as labels 914 for the content item 602.

The name 922 assigned to an element 726 may be used by label extraction module 610 to determine the label 914. The conditions 910 indicate what conditions must be satisfied for the content item 602 to be considered to have label 914. For example, a condition 910 for a label 914 of shorts may be that the name 922 of the element 726 is shorts. The condition 910 may include multiple conditions and may be based on any of the fields of the content item 602, the elements 726, and labels 914 associated with the content item 602. In another example, conditions 910 of a label 914 for "fun" may include that the content item 602 has at least two people that are smiling. In another example, condition 910 of a label 914 for bowling may include that a person is bowling and that the location is a bowling alley. The location may be determined via content related items 702, which may include a geographic location of where the content item 602 was captured. The conditions 910 may be satisfied by labels 914 that are related in the hierarchy 913. For example, a condition 910 for a label 914 of bowling may be that a person is at a location identified as a bowling alley. The element 726 may be a child that is identified as a label 914 child and then the label 914 person is added as the parent of label 914 child in the hierarchy 913. The conditions 910 for the label 914 bowling may then be met.

The label extraction module 610 associates the content item 602 with the label 914 it is determined to have. The visual tags extraction module 610 builds labels database 614 that is used by determine engagement scores module 622 to determine engagement scores for label 914.

Figure 10:
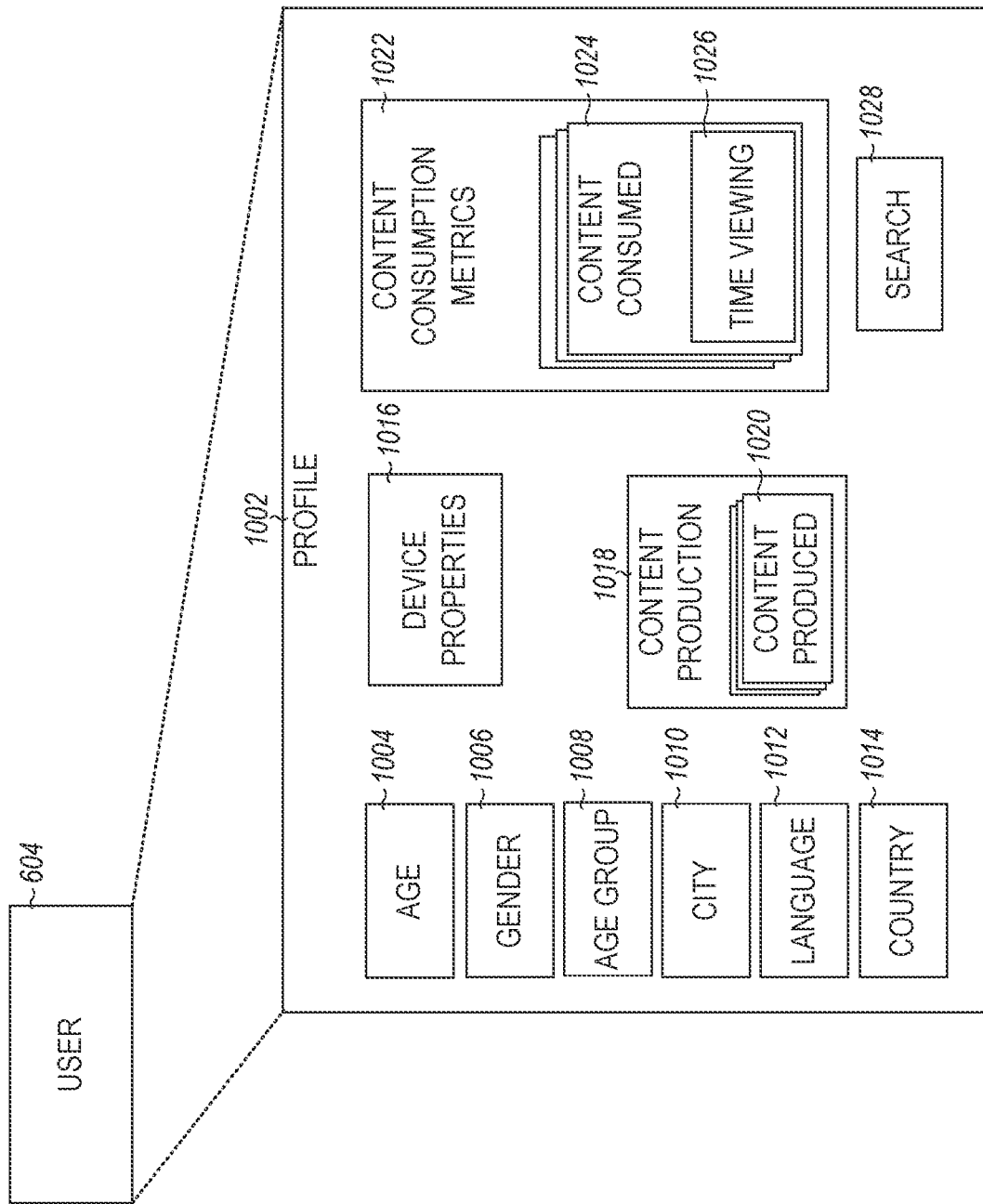
FIG. 10 illustrates a profile of a user, in accordance with some embodiments.

FIG. 10 illustrates a profile 1002 of a user 604, in accordance with some embodiments. The profile 1002 includes age 1004, gender 1006, age group 1008, city 1010, language 1012, country 1014, device properties 1016, content production 1018, content produced 1020, content consumption metrics 1022, content consumed 1024, time viewing 1026, and search 1028.

Age 1004 is the age or an age range of the user 604. Gender 1006 is an indication of a gender of the user 604. Age group 1008 is an indication of an age group of the user 604 such as 18-24 years old and so forth. City 1010 is an indication of a city the user 604 resides in, works in, or is associated with. Language 1012 is an indication of a human natural language used by the user 604 within the messaging system 100. Country 1014 is an indication of a country associated with the user 604 such as a country 1014 in which the user 604 resides. Device properties 1016 is properties of one or more devices the user 604 uses including the device the user 604 uses to access the messaging system 100. Content production 1018 is data regarding the content item 602 the user 604 has produced 606. The data may include indications of the content produced 1020, which may include modifications used by the user 604, topics 704 of the content produced 1020, terms 716 of the content produced, which other users 604 was the content produced 1020 sent to, whether the content produced 1020 was made public, whether the content produced 1020 was part of an ephemeral message, and so forth.

Content consumption metrics 1022 includes data regarding content consumed 608 by the user 604. Content consumption metrics 1022 may include an indication of the content consumed 1024 and a time viewing 1026 the content. The data may include interactions the user 604 had with the content consumed 1024 such as whether the user 604 responded to the content item 602, viewed the content item 602 multiple times, liked the content item 602, and other content consumption metrics. Search 1028 indicates searches 1028 that have been performed by the user 604. In some embodiments, there may be more than one of the fields such as city 1010, language 1012, and so forth.

Figure 11:
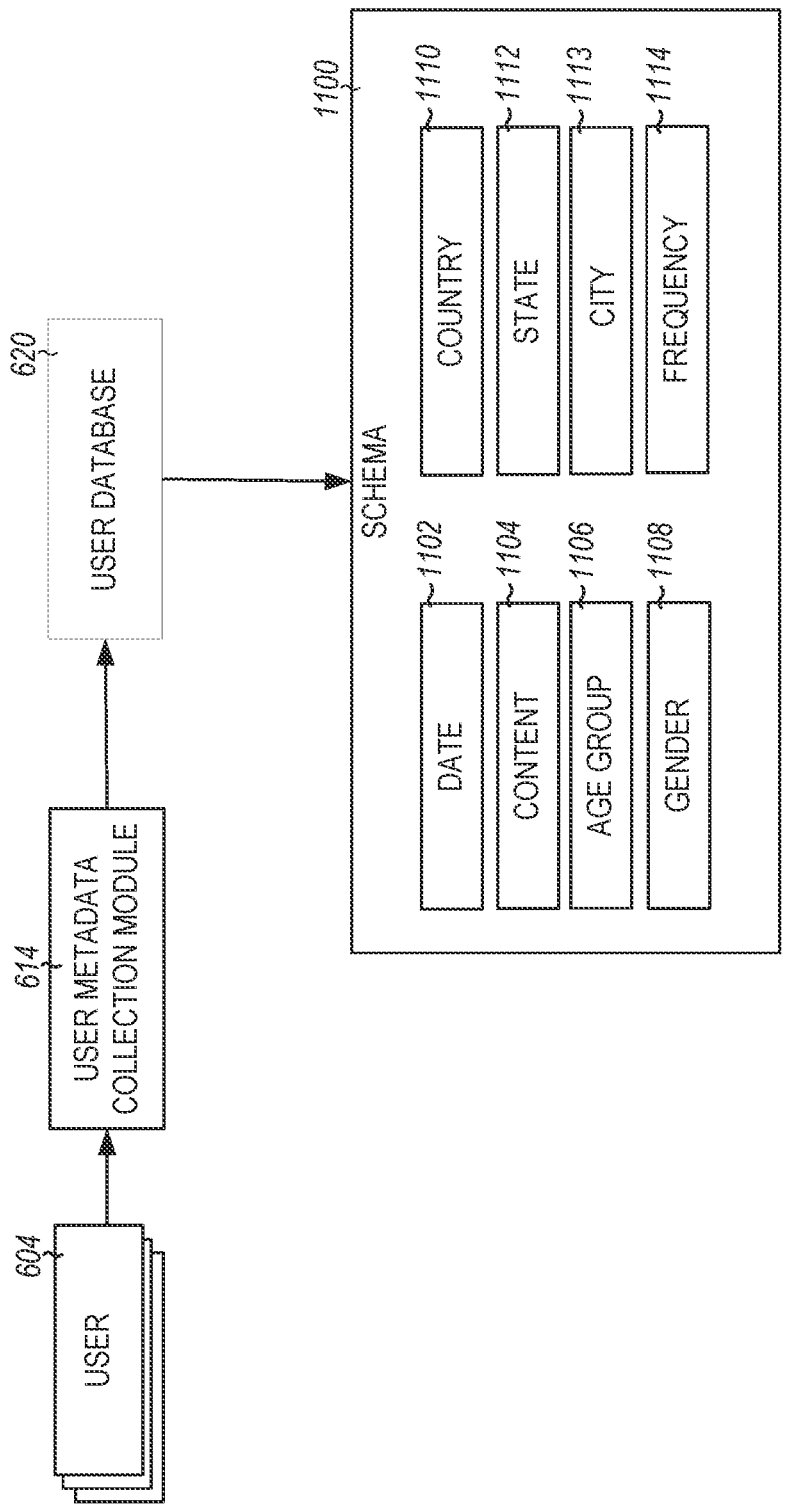
FIG. 11 illustrates user metadata collection module, in accordance with some embodiments.

FIG. 11 illustrates user metadata collection module 613, in accordance with some embodiments. The user metadata collection module 613 uses information from users 604 to generate user database 620 where the user database 620 captures information about users 604. In some embodiments the user database 620 protects the privacy of the users 604. Some of the data associated with users 604 is filtered or not used in the schema 1100. For example, username, address, account identifier, and so forth, are not used in the schema 1100 to protect the privacy of the users 604. The age of the user 604 is grouped into an age group 1106. In some embodiments only users 604 are added to the user database 620 if they have interacted with content item 602 a threshold number of times such as one, five, or another number. The user metadata collection module 613 aggregates the frequency 1114 of interactions of users 604 with content 1104 based on a content consumption metric and date 1102 where the data 1102 may be a range and where the aggregation is based on one or more of: age group 1106, gender 1108, country 1110, state 1112, and city 1113.

Figure 12:
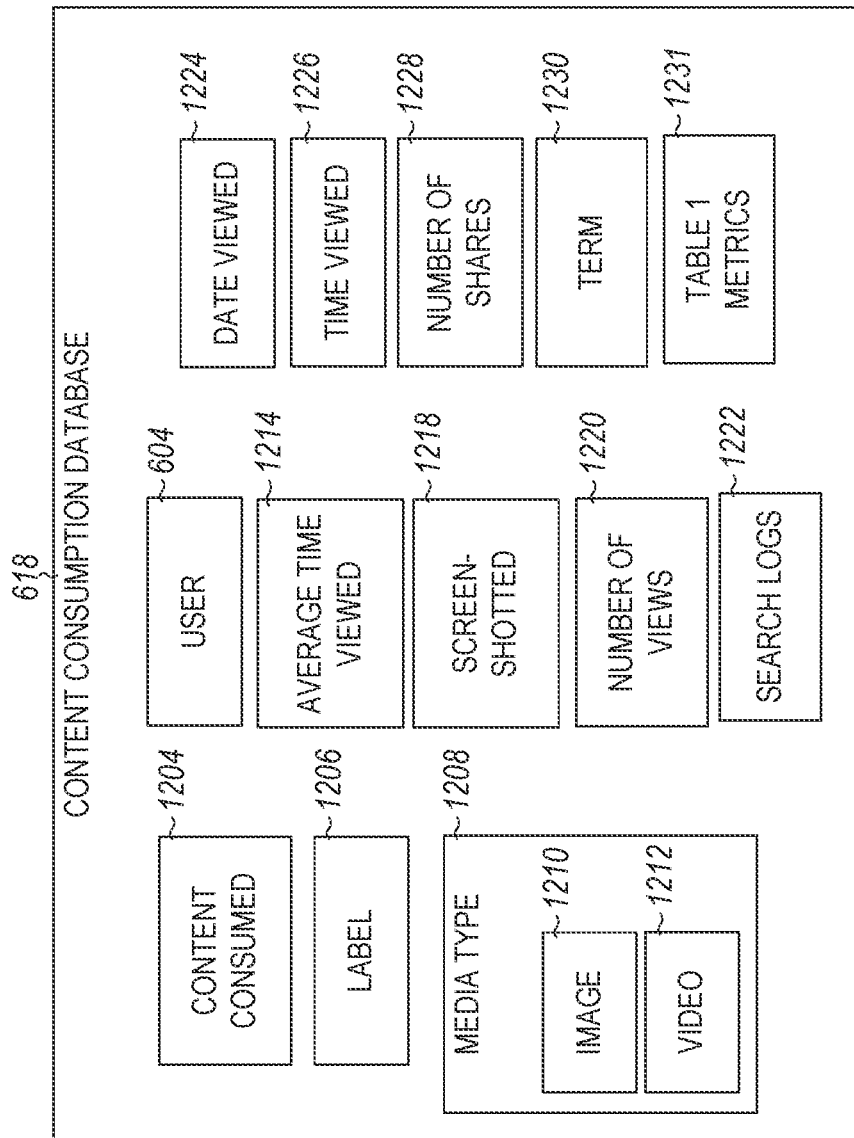
FIG. 12 illustrates the content consumption database, in accordance with some embodiments.

FIG. 12 illustrates the content consumption database 618, in accordance with some embodiments. The content consumption database 618 includes content consumed 1204, label 1206, media type 1208, image 1210, video 1212, user 604, average time viewed 1216, screenshotted 1218, number of views 1220, search logs 1222, date viewed 1224, time viewed 1226, number of shares 1228, term 1230. There may be other metrics used by content consumption metrics extraction module 612 for content consumption database 618. The content consumption database 618 may be organized in accordance with schema 1412 of FIG. 14. Content consumed 1204 is an indication of the content item 602. Label 1206 is one or more labels 914 of FIG. 9 that label extraction module 610 determined the content item 602 should have. Term 1230 may be the same or similar as term 716 of FIG. 7. Media type 1208 indicates a type of media of the content consumed 1204 such as image 1210, video 1212, audio, search logs, and so forth. User 604 indicates one or more users 604 that consumed the content consumed 1204. Average time viewed 1214 indicates an average time user 604 spent viewing the content consumed 1204. Screenshotted 1218 indicates a number of times or average number of times the content consumed 1204 was screenshotted 1218. Number of views 1220 indicates a number of views of the content consumed 1204. Search logs 1222 indicates a number of times that content consumed 1204 appeared in searches and/or a number of times the content consumed 1204 was selected from searches. Date viewed 1224 indicates a time window for the statistics regarding the content consumed 1204. Time viewed 1226 indicates one or more statistics regarding the viewing of the content consumed 1204 by one or more users 1214. Number of shares 1228 indicates statistics regarding a number of shares of content consumed 1204 by one or more users 1214. The content consumption database 618 includes Table 1 metrics 1231, in accordance with some embodiments. Table 1 metrics 1231 includes the metrics disclosed in Table 1 below. It will be appreciated that content consumption database 618 may include additional metrics regarding the content consumed 1204 by one or more users 1214.

Figure 13:
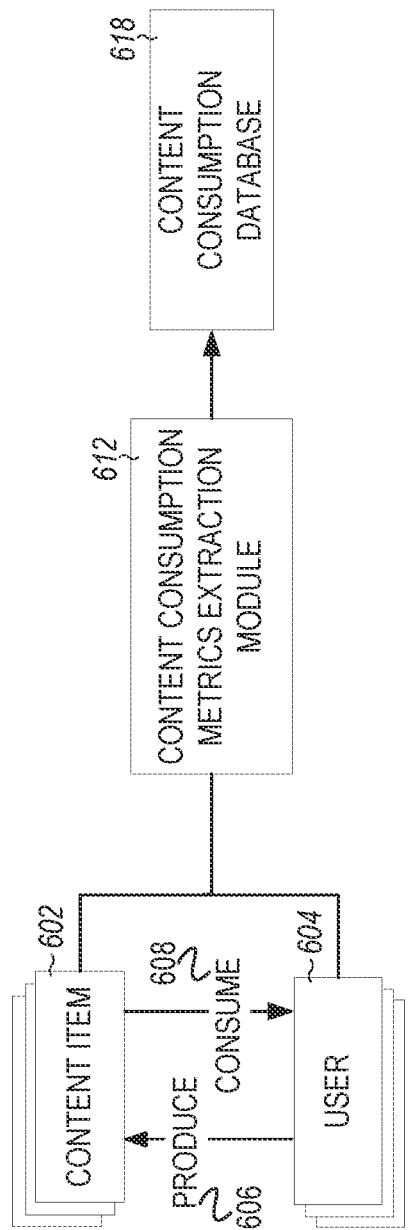
FIG. 13 illustrates content consumption metrics extraction module, in accordance with some embodiments.

FIG. 13 illustrates content consumption metrics extraction module 612, in accordance with some embodiments. The content consumption metrics extraction module 612 builds content consumption database 618 based on produce 606, consume 608, user 604, and content item 602. For example, a user 604 may access a content item 602 and view the content item 602 on their mobile device. The content consumption metrics extraction module 612 updates a database entry for the content consumed 1204 of FIG. 12 that matches the content item 602 where user 604 is added as a user 1214, the average time viewed 1216 is updated, number of views 1220 is updated, data viewed 1224 is updated, time viewed 1226 is updated, and so forth, in accordance with the interaction the user 1214 had with the content item 602 indicated in content consumed 1204.

Figure 14:
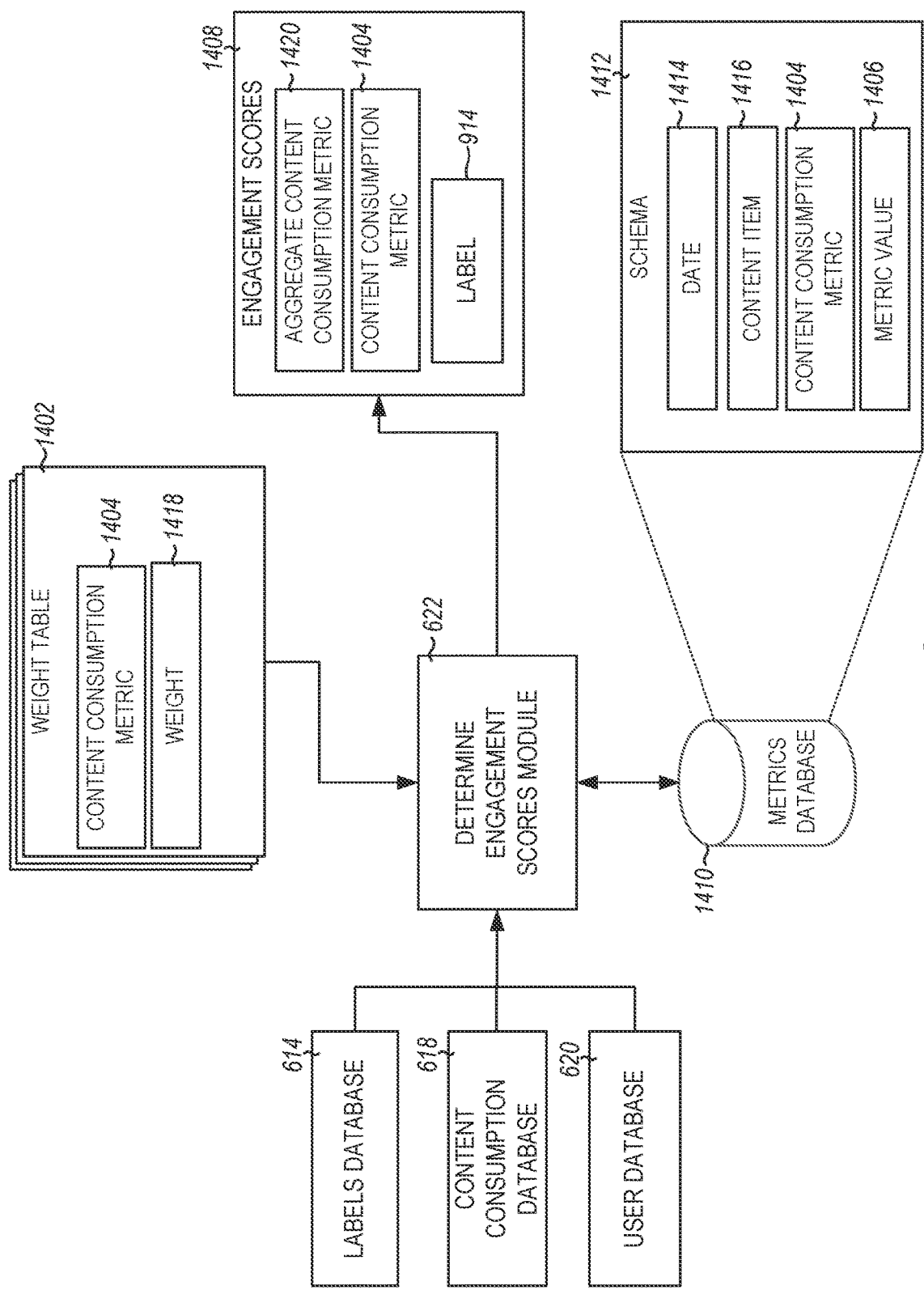
FIG. 14 illustrates determine engagement scores module, in accordance with some embodiments.
Figure 15:
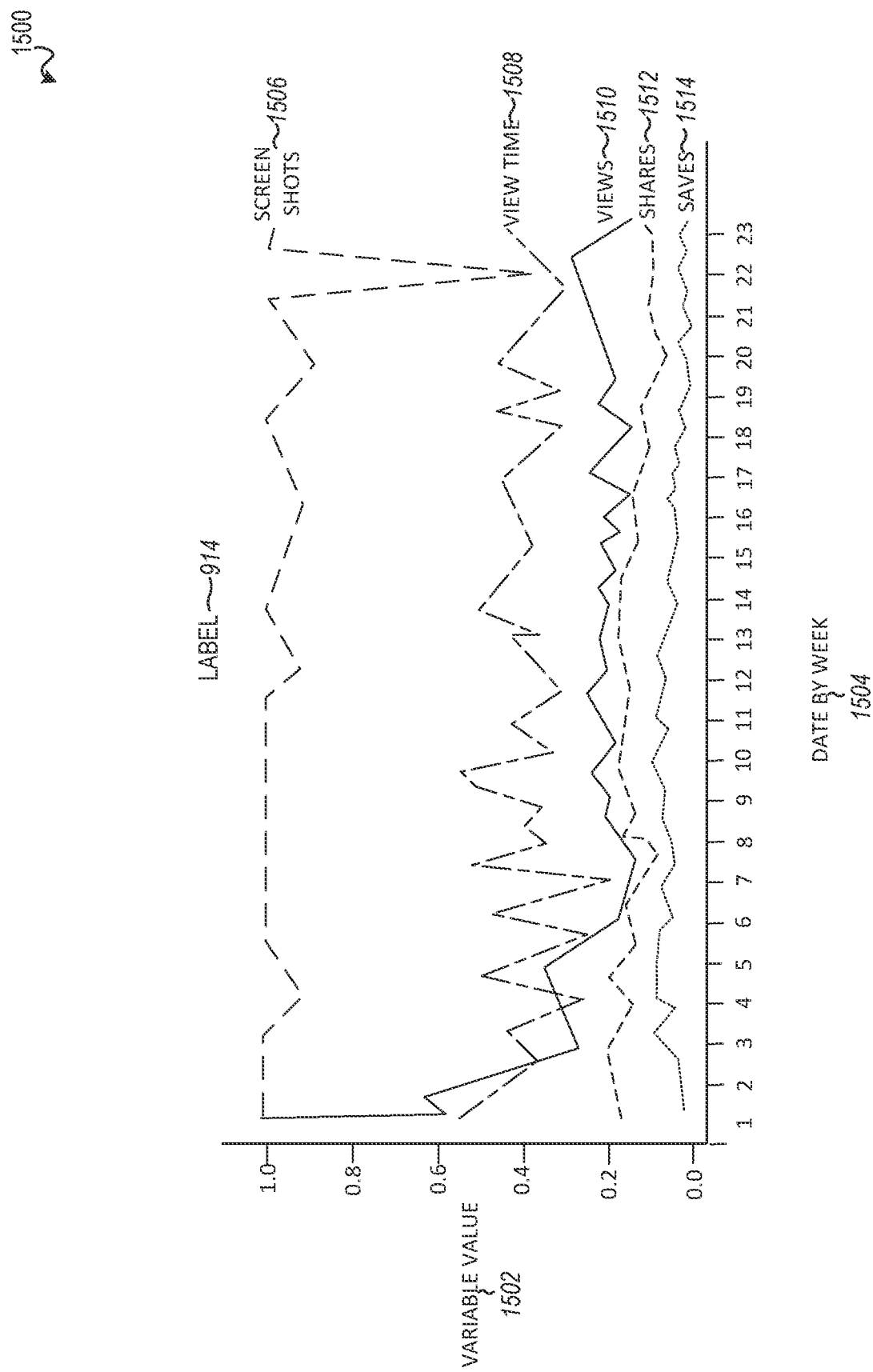
FIG. 15 illustrates a graph of usage of a label, in accordance with some embodiments.
Figure 16:
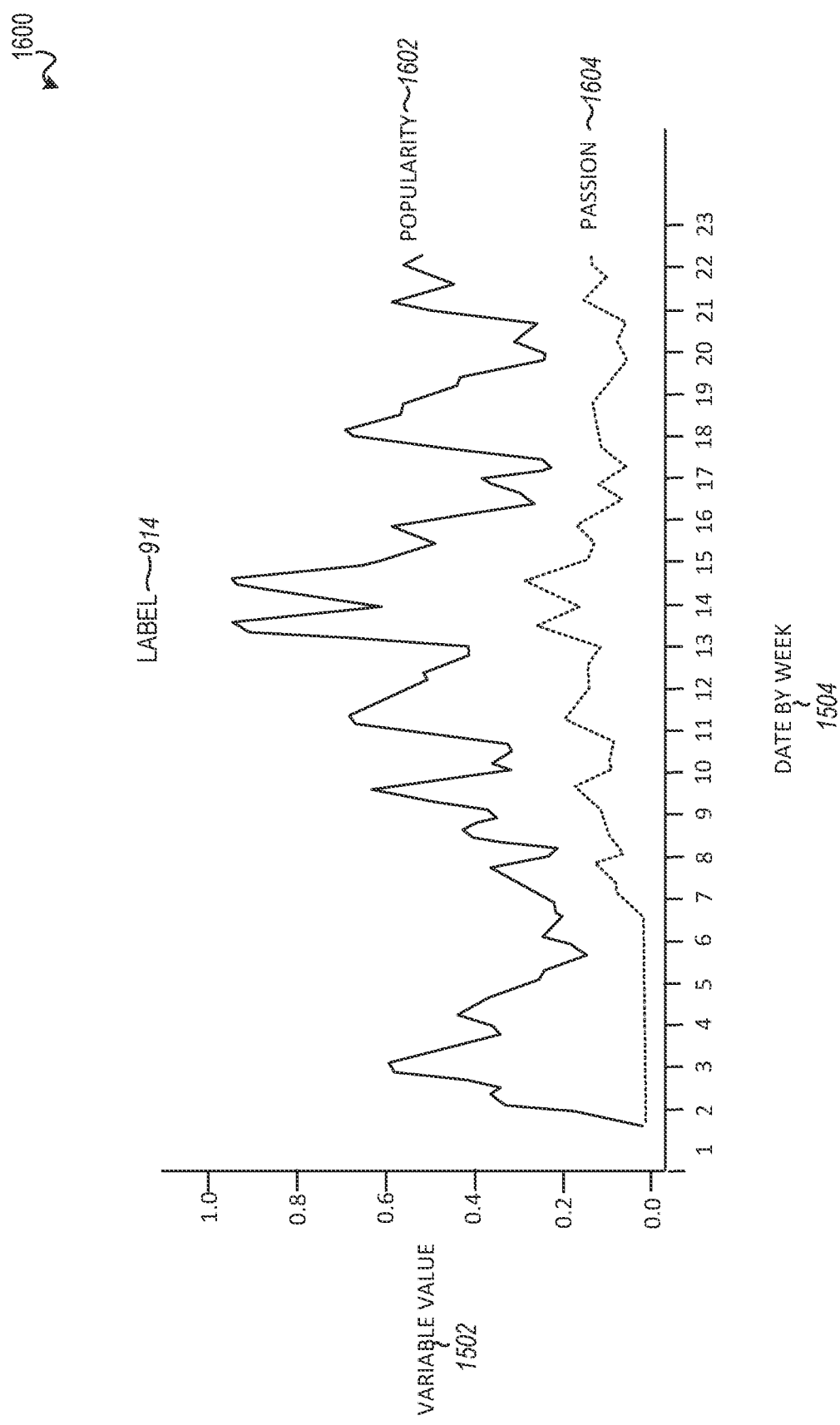
FIG. 16 illustrates a graph of usage of a label, in accordance with some embodiments.

FIGS. 14-16 are discussed in conjunction with one another. FIG. 14 illustrates determine engagement scores module 622, in accordance with some embodiments. The determine engagement scores module 622 uses statistics from labels database 614, content consumption database 618, and user database 620 to generate metrics database 1410. And then determine engagement scores module 622 using metrics database 1410 and weight table 1402 determines engagement scores 1408. The engagement scores 1408 includes aggregate content consumption metric 1420 and content consumption metric 1404 where both are for a label 914.

Metrics database 1410 is organized in accordance with a schema 1412, in accordance with some embodiments. The schema 1412 includes date 1414, content item 1416, content consumption metric 1404, and metric value 1406. The date 1414 may be the same or similar as date 1102 of FIG. 11. Content item 1416 may be an indication of a content item 602. Content consumption metric 1404 includes one or more of the fields disclosed in conjunction with FIG. 12. Metric value 1406 is a value for the corresponding content consumption metric 1404.

FIG. 15 illustrates a graph 1500 of usage of a label, in accordance with some embodiments. Illustrated in FIG. 15 is variable value 1502 along a vertical axis and date by week 1504 along a horizontal axis. The variable value 1502 is a normalized value of the content consumption metric 1404, which includes screen shots 1506, view time 1508, views 1510, shares 1512, and saves 1514. A share indicates that a user 604 shared the content item 602 with another user 604 of the messaging system 100 such as in an ephemeral message.

The graph 1500 is presented by user interface module 628, in accordance with some embodiments. An example label 914 is bicycles with the different content consumption metrics 1404. It may be difficult for a user to understand the graph 1500 even with only five content consumption metrics 1404 graphed. In some embodiments, the graph 1500 includes additional content consumption metrics 1404 from content consumption database 618 and Table 1, which may make it difficult to understand how the content items 602 with the label 914 of bicycles are performing in regards to users 604 creating and consuming content items 602 with the label 914 bicycles.

Table 1 illustrates content consumption metrics 1404 with weights 1418 for popularity and weights 1418 for passion.

TABLE 1

| Content Consumption Metric | Weight for Popularity | Weight for Passion |
|---|---|---|
| Records | 2 | 0 |
| Views | 4 | 0 |
| View Time Ratio | 0 | 4 |
| Auto Advance | 0 | 1 |
| Back Pressed | −1 | 0 |
| Screenshots | 0 | 1 |
| Shares | 1 | 0 |
| Completion P25 | 0 | −2 |
| Completion P50 | 0 | −1 |
| Completion P75 | 0 | 0 |
| Completion P100 | 0 | 1 |
| Swipe down | −1 | 0 |
| Swipe up | 0 | 1 |
| Tap back | 0 | −1 |
| Tap forward | −1 | 0 |

The determine engagement scores module 622 uses weight table 1402 and metrics database 1410 to determine aggregate content consumption metrics 1420. The weight table 1402 includes content consumption metric 1404 and weight 1418. Table 1 is an example of a weight table 1402 for two aggregate content consumption metrics 1420 of popularity and passion. The aggregate content consumption metrics 1420 may be easier for a person to understand the consumption of content items 602 with label 914. The column weight for popularity and the column weight for passion are weights 1418 for content consumption metrics 1404. In Table 1, the weight for popularity is 4 for views and the weight for passion is 0 for views.

In some embodiments, determine engagement scores module 622 is configured to determine engagement scores 1408 such as popularity and passion in accordance with Equations (1)-(3). Equation (1): W={w(1), w(2), ..., w(n)}, where W is a vector of weights 1418 and w(n) is the nth weight. Examples of W are the columns of Table 1 of weight for popularity and weight for passion. Equation (2): M={m(1), m(2), ..., m(n)}, M is a vector of values 1406 of content consumption metrics 1404 where m(n) is the metric value 1406 of the nth content consumption metric 1404 for a label 914. Equation (3): Score=w(1)*m(1)+w(2)*m(2) ... +w(n)*m(n), where the score can correspond to the popularity 1602 or the passion 1604 of a label 914 for date or time window. For the example of bicycles as the label 914 each metric value 1406 of the nth content consumption metrics 1404, m(n), of Table 1 is multiplied by a corresponding weight 1418 of weight for popularity or weight for passion to determine a value for the popularity 1602 or passion 1604, respectively. Popularity 1602 and passion 1604 are both engagement scores 1408 of type aggregate content consumption metric 1420 for a label 914.

FIG. 16 illustrates a graph 1600 of usage of a label 914, in accordance with some embodiments. Graph 1600 illustrates the normalized values for popularity 1602 and passion 1604 for the content consumption metrics in Table 1 for label 914 during the weeks 1-23. The label 914 is bicycles the same as in FIG. 15. The graph 1600 may be easier for a person to understand and interpret than the graph 1500. The graph 1600 is created using Equations (1)-(3), in accordance with some embodiments.

Figure 17:
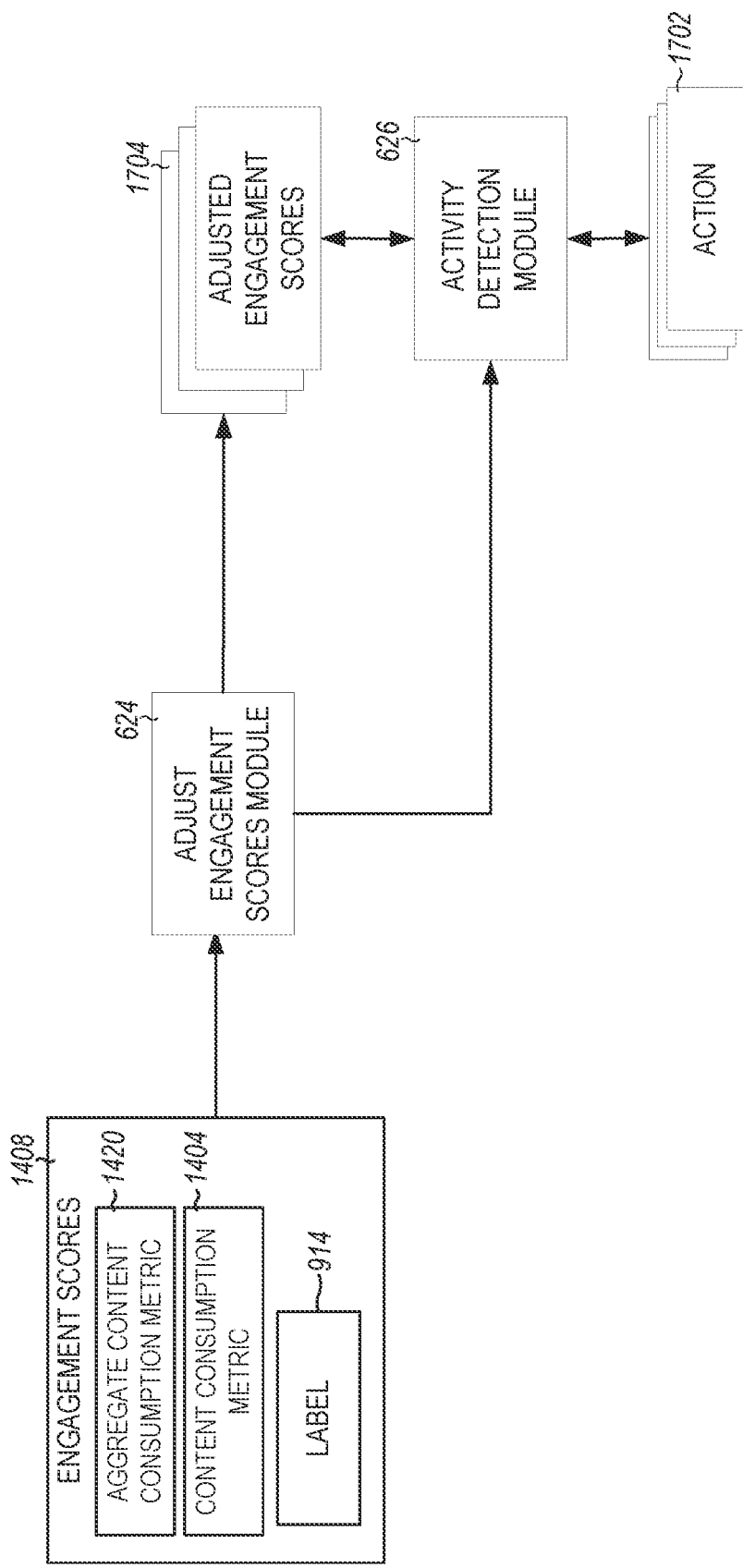
FIG. 17 illustrates adjust engagement scores module, in accordance with some embodiments.

FIG. 17 illustrates adjust engagement scores module 624, in accordance with some embodiments. The adjust engagement scores module 624 takes the engagement scores 1408 and adjusts them to generate adjusted engagement scores 1704. The activity detection module 626 monitors the adjusted engagement scores 1704 and notifies a user when the adjusted engagement scores 1704 are unusually low or high. For example, the determine engagement scores module 622 may continuously update the engagement scores 1408 and adjust engagement scores module 624 may continuously determine adjusted engagement scores 1704. Activity detection module 626 detects abnormal or not normal scores and may take an action 1702 based on the abnormal or not normal scores. For example, activity detection module 626 may in FIG. 25 detect trend variable values 2504 of false 2210, in FIG. 26 detect trend variable values 2604 of false 2610, in FIG. 27 detect trend variable values 2704 of false 2710, in FIG. 28 detect trend variable values 2804 of false 2810, and/or in FIG. 29 detect trend variable values 2904 of false 2910. Activity detection module 626 may take an action 1702 of notifying a user that a TV associated with a label is outside a normal range. Activity detection module 626 may cause content items 602 associated with the label to be generated by another module or may prompt a user to generate additional content items 602 associated with the label. Activity detection module 626 may take an action 1702 of causing modifications 722 related to the label to be generated that the augmentation system 206 may make available to the user 604.

The adjustments that the adjust engagement scores module 624 makes to the engagement scores 1408 to generate adjusted engagement scores 1704 are discussed in conjunction with FIGS. 18-29.

Figure 18:
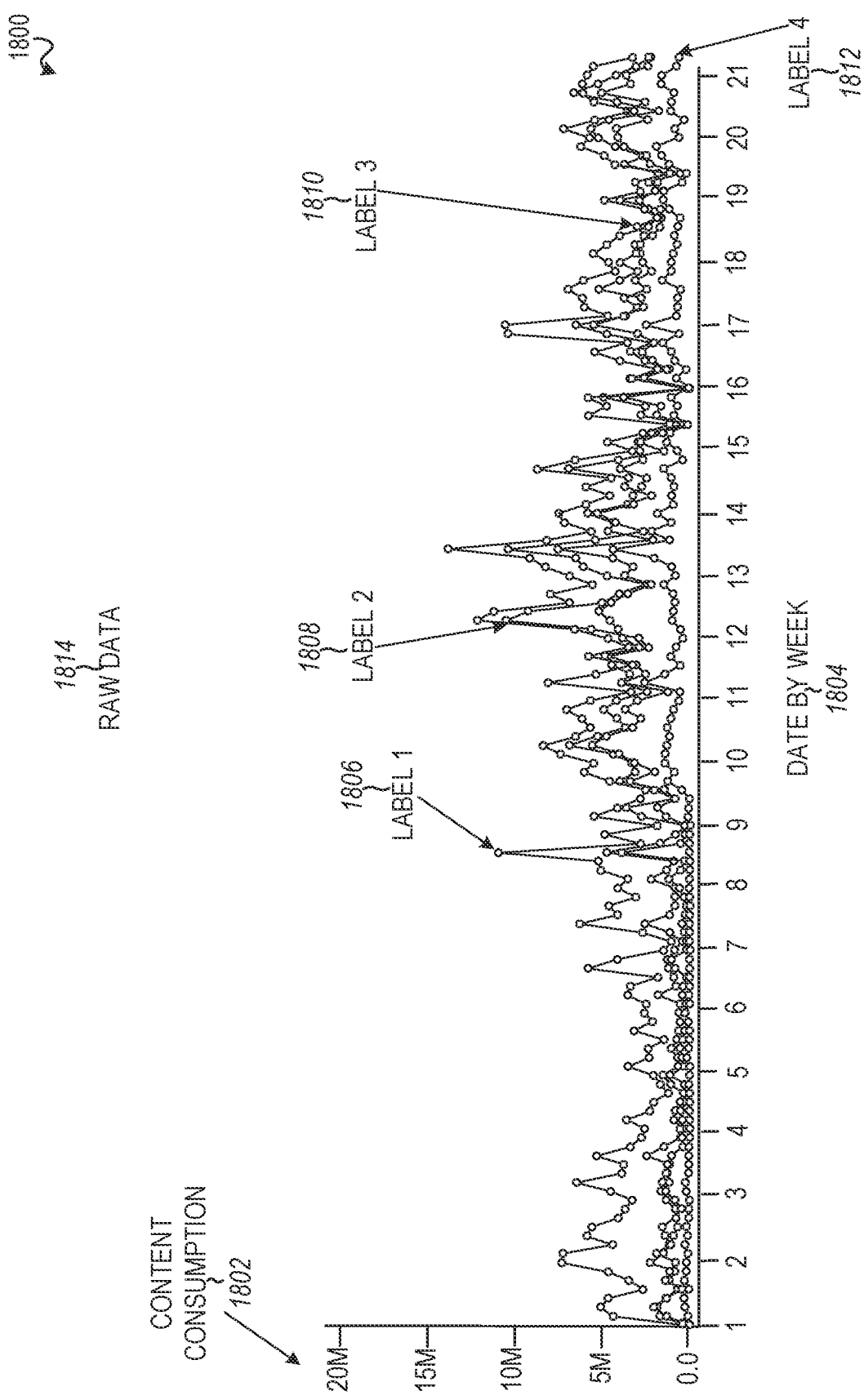
FIG. 18 illustrates raw data for four labels, in accordance with some embodiments.

FIG. 18 illustrates raw data 1814 for four labels, in accordance with some embodiments. Illustrated in FIG. 18 is content consumption 1802 along a vertical axis and date by week 1804 along a horizontal axis. The content consumption 1802 indicates a number of content items 602 that were consumed 608 that had label 1 1806, label 2 1808, label 3 1810, or label 4 1812. The labels are example labels such as indoors, outdoors, cat, dog, bowling, sports, friends, running, and so forth. On some days or weeks, the content consumption 1802 for a label may be zero. It may be difficult to interpret the content consumption 1802 of the labels due to the variations week to week as indicated by date by week 1804. The content consumption 1802 is an indication of user 604 engagement with the labels.

In some embodiments, the content consumption 1802 can be represented by a time series as indicated in Equation (4) that breaks the content consumption 1802 into a trend component, a seasonality component, and a residual, which may be that portion of the content consumption 1802 that cannot be attributed to a trend component or a seasonality component.

$$\text{TIME}_{SERIES} = \text{TREND}_{COMPONENT} + \text{SEASONALITY}_{COMPONENT} + \text{RESIDUAL}. \quad \text{Equation (4):}$$

Figure 19:
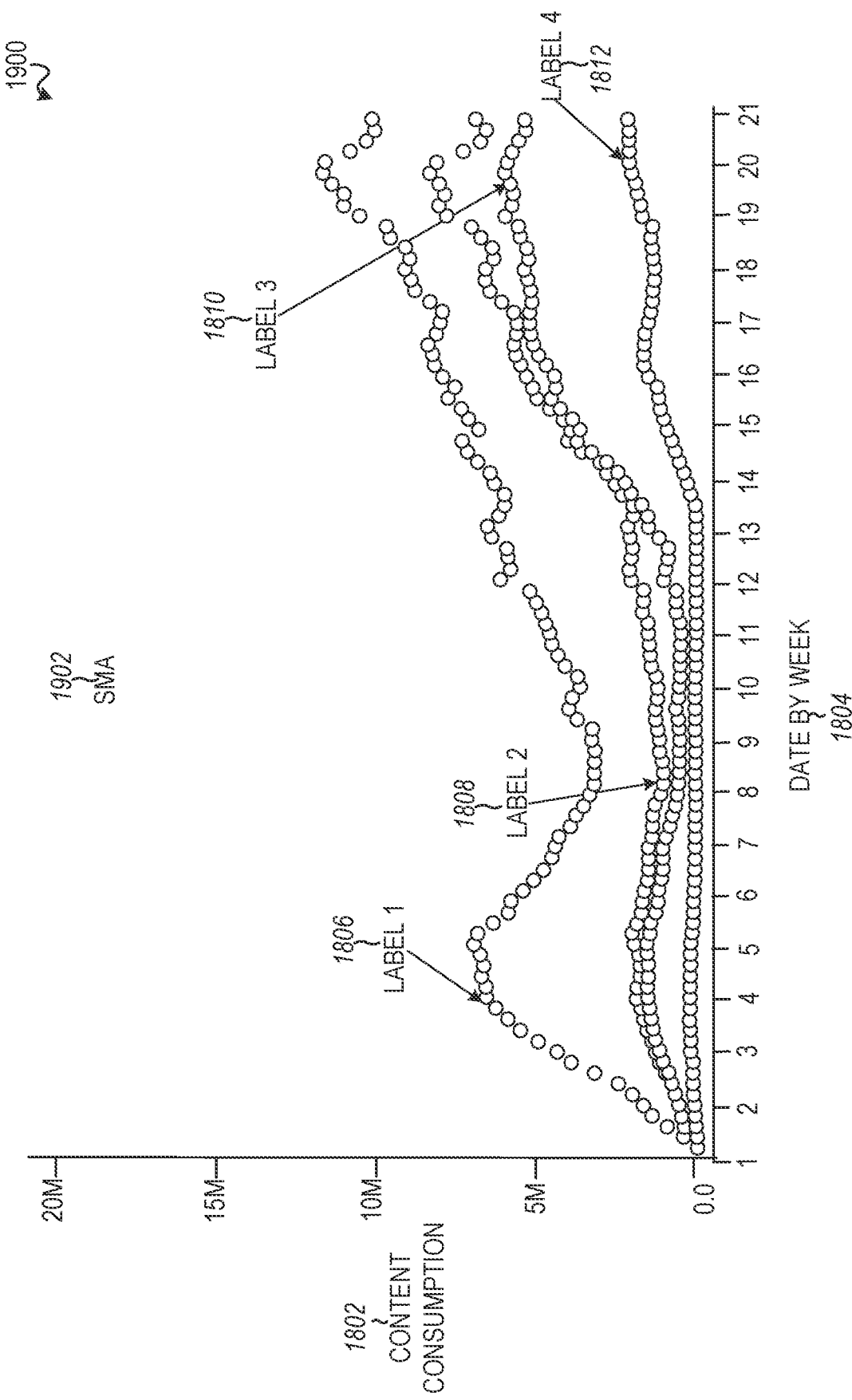
FIG. 19 illustrates a graph of a simple moving average (SMA) of the labels, in accordance with some embodiments.

FIG. 19 illustrates a graph 1900 of a simple moving average (SMA) 1902 of the labels, in accordance with some embodiments. Adjust engagement scores module 624 determines SMA based on Equations (5) and (6) using the same raw data 1814 of FIG. 18.

$$SMA_m^l(d_k, w) = SMA(d_k, w) = \frac{1}{w} * \sum_{i=k-w+1}^{k} m_{normalized}(l, d_i), \quad \text{Equation (5)}$$

where $d_i$ is the ith date, $m_{normalized}(l, d_i)$ is the value of the content consumption metric 1404 or the value of the aggregate content consumption metric 1420 of label, l, on $d_i$, w is the time-window size, and $d_k$ is the date for which the SMA is being determined. Equation (5) is for when $d_k >= w$ and Equation (6) is for when $d_k < w$.

$$SMA_m^l(d_k, w) = SMA(d_k, w) = \frac{1}{w} * \sum_{i=k-w+1}^{k} m_{normalized}(l, d_i). \quad \text{Equation (6)}$$

The window size, w, for graph 1900 used was 14 days. Other window sizes may be used such as 7 days, 28 days, and so forth.

Figure 20:
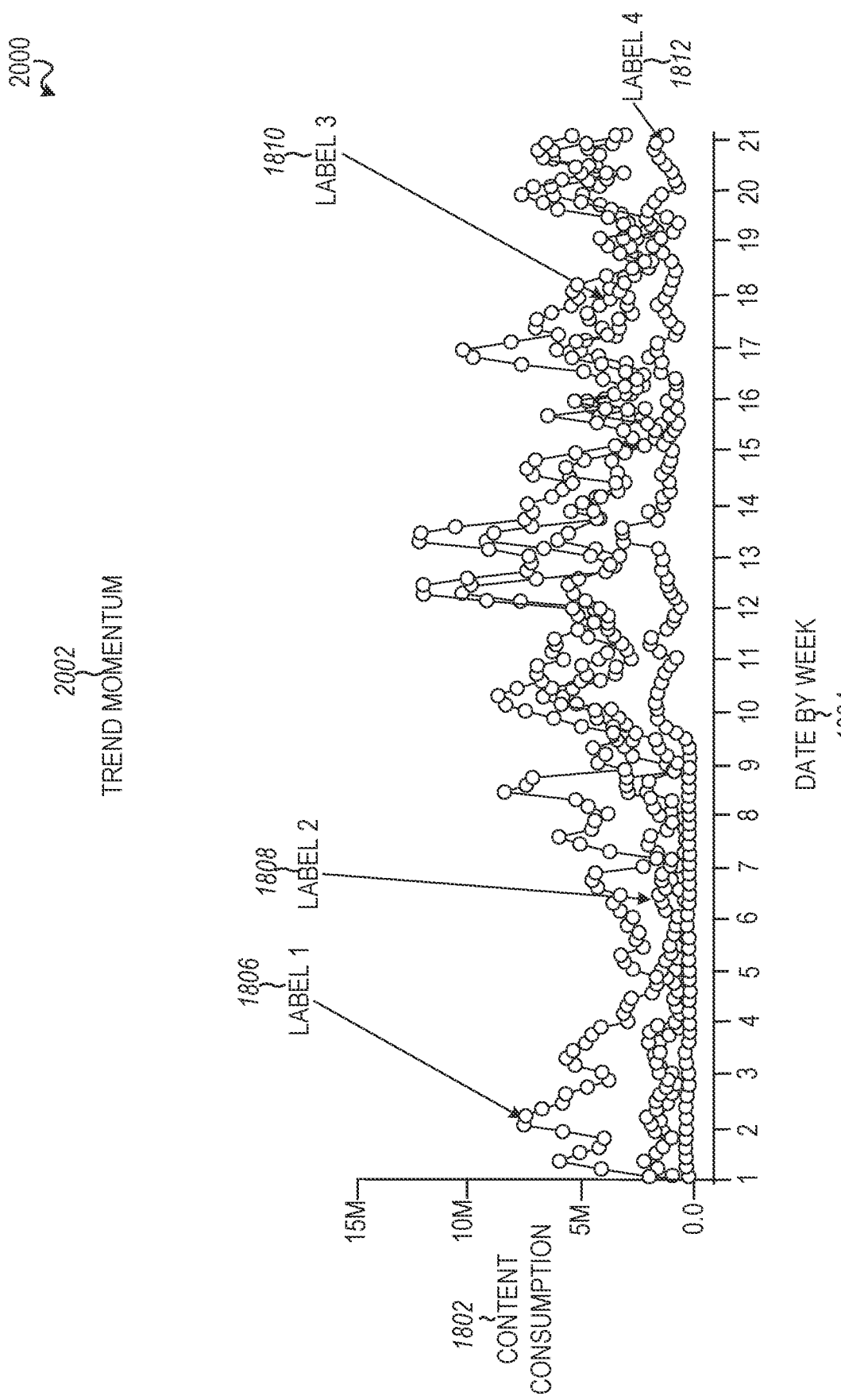
FIG. 20 illustrates a graph of trend momentum (TM) of labels, in accordance with some embodiments.

FIG. 20 illustrates a graph 2000 of trend momentum (TM) 2002 of labels, in accordance with some embodiments. Adjust engagement scores module 624 determines trend momentum 2002 for the labels based on Equation (7) using the same raw data 1814 of FIG. 18.

$$TM_m^l(d_k) = TM(d_k) = SMA(d_k, w_{short}) - (SMA(d_k, w_{long}))^\alpha, \quad \text{Equation (7):}$$

where $w_{short}$ is the short-term time-window size, $w_{long}$ is the long-term time-window size, and $\alpha$ is the weight where $\alpha$ is assigned a value between 0 and 1. Adjust engagement scores module 624 used $w_{short}=3$ days, $w_{long}=7$ days, and $\alpha=0.9$ for graph 2000. In some embodiments, the engagement scores are adjusted to determine a TM where the TM is based on subtracting a first SMA with a first window from a second SMA with a second window, where the second window is shorter than the first window.

Figure 21:
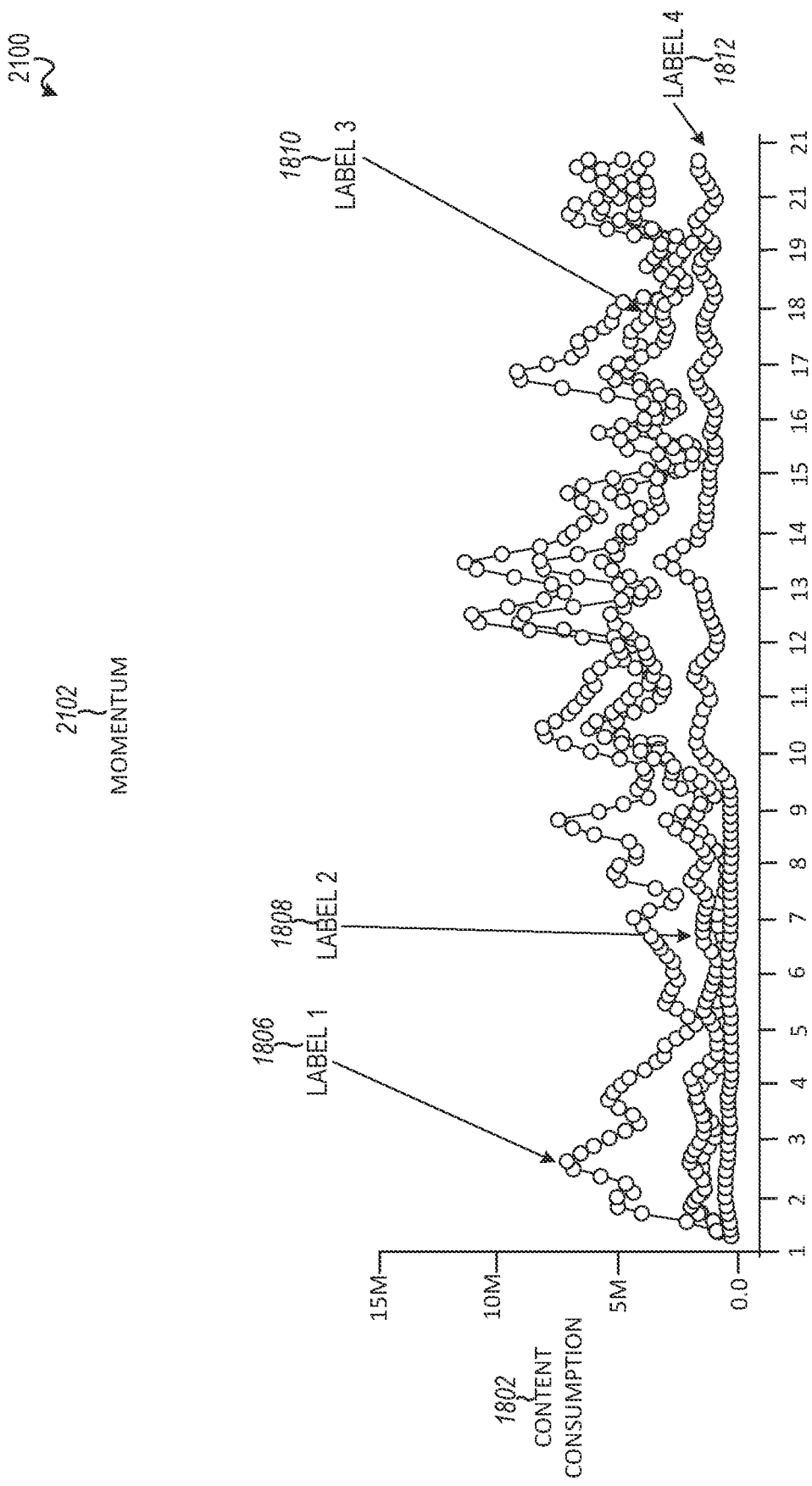
FIG. 21 illustrates a graph of momentum (M), in accordance with some embodiments.

FIG. 21 illustrates a graph 2100 of momentum (M) 2102, in accordance with some embodiments. Adjust engagement scores module 624 determines trend momentum 2002 for the labels based on Equation (7) using the raw data 1814 of FIG. 18. Equation (8): $M_m^l(d_k)=M(d_k)=SMA(TM(d_k), w)$, where w is the time-window size. Adjust engagement scores module 624 used w=7 days for graph 2100.

Figure 22:
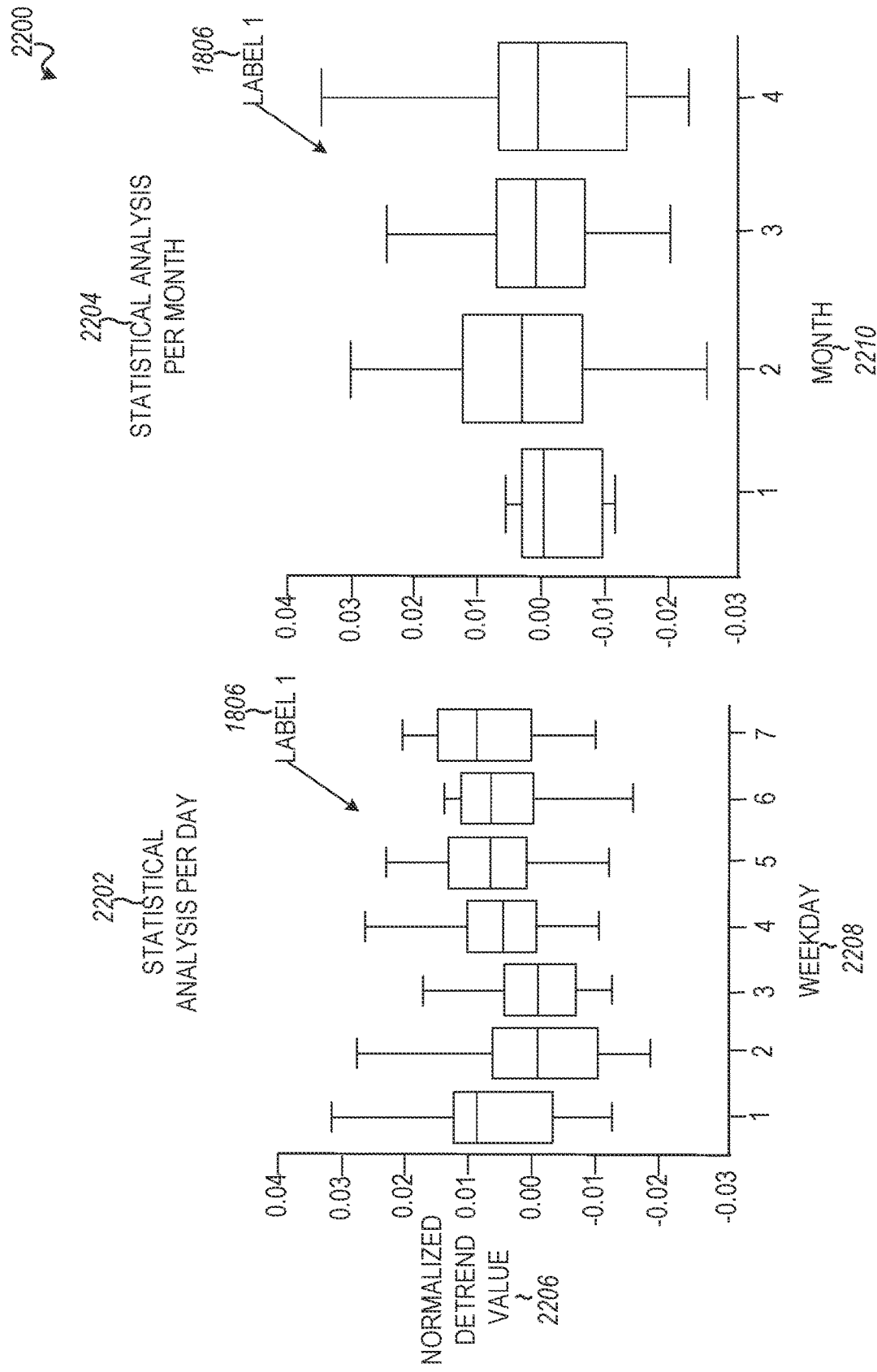
FIG. 22 illustrates graphs of statistical analysis of label 1, in accordance with some embodiments.

FIG. 22 illustrates graphs 2200 of statistical analysis of label 1 1806, in accordance with some embodiments. Adjust engagement scores module 624 determines statistical analysis per day 2202 and statistical analysis per month 2204 for the label 1 1806 based on range of values, standard deviation, and percentiles using the raw data 1814 of FIG. 18. Illustrated in FIG. 22 is normalized detrend value 2206 along a vertical axis and weekday 2208 or month 2210 along a horizontal axis.

Figure 23:
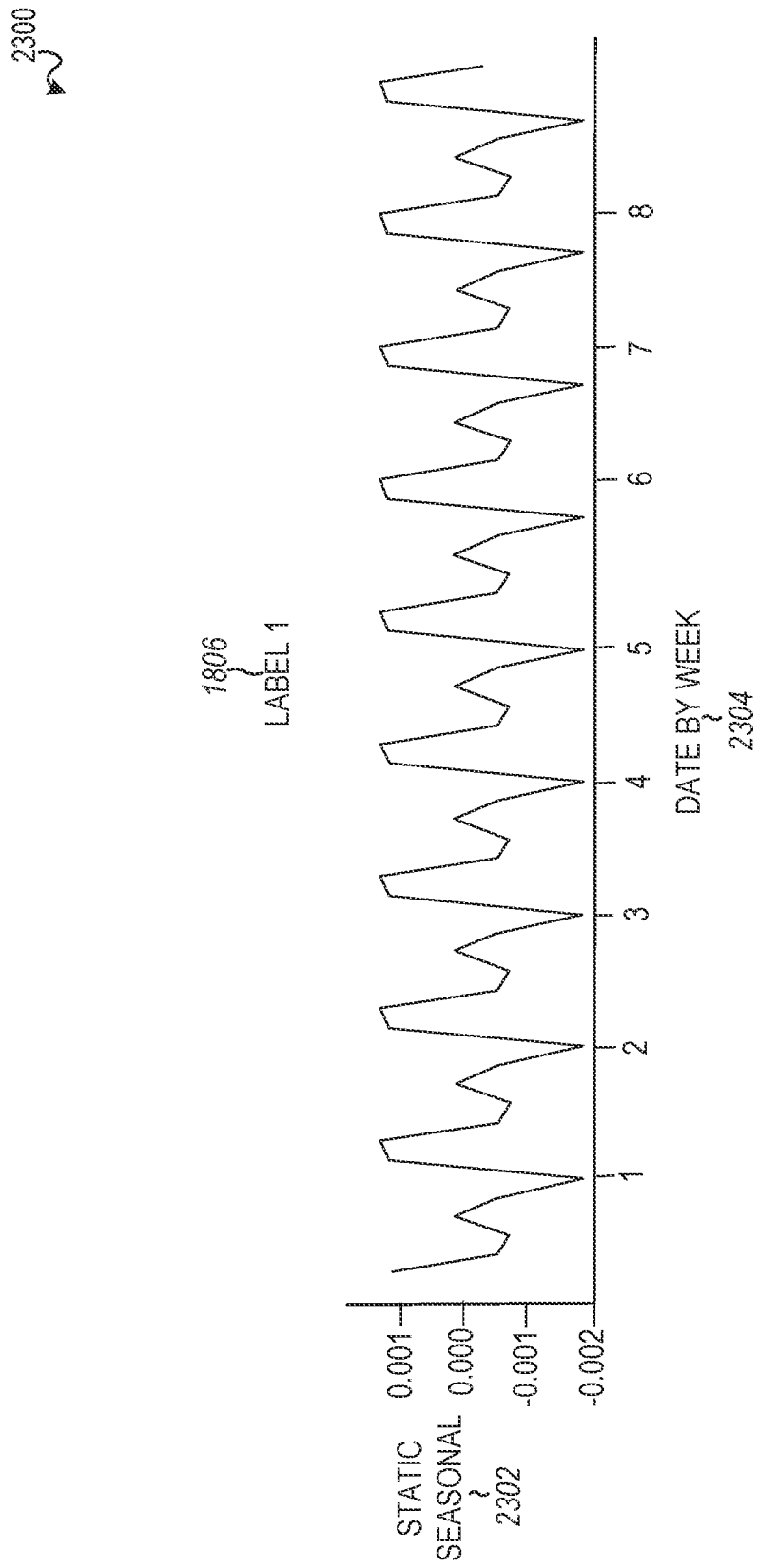
FIG. 23 illustrates graph of static seasonality of label 1, in accordance with some embodiments.

FIG. 23 illustrates graph 2300 of static seasonality of label 1 1806, in accordance with some embodiments. Adjust engagement scores module 624 determines values for static seasonal 2302 for label 1 1806 based on Equation (9) using the raw data 1814 of FIG. 18. Equation (9): detrend=time$_{series}$−trend$_{component}$. So in accordance with Equation (9), detrend is the time series without the trend component. Illustrated in FIG. 23 is static seasonal 2302 along a vertical axis and date by week 2304 along a horizontal axis. Static seasonal 2302 is normalized.

Figure 24:
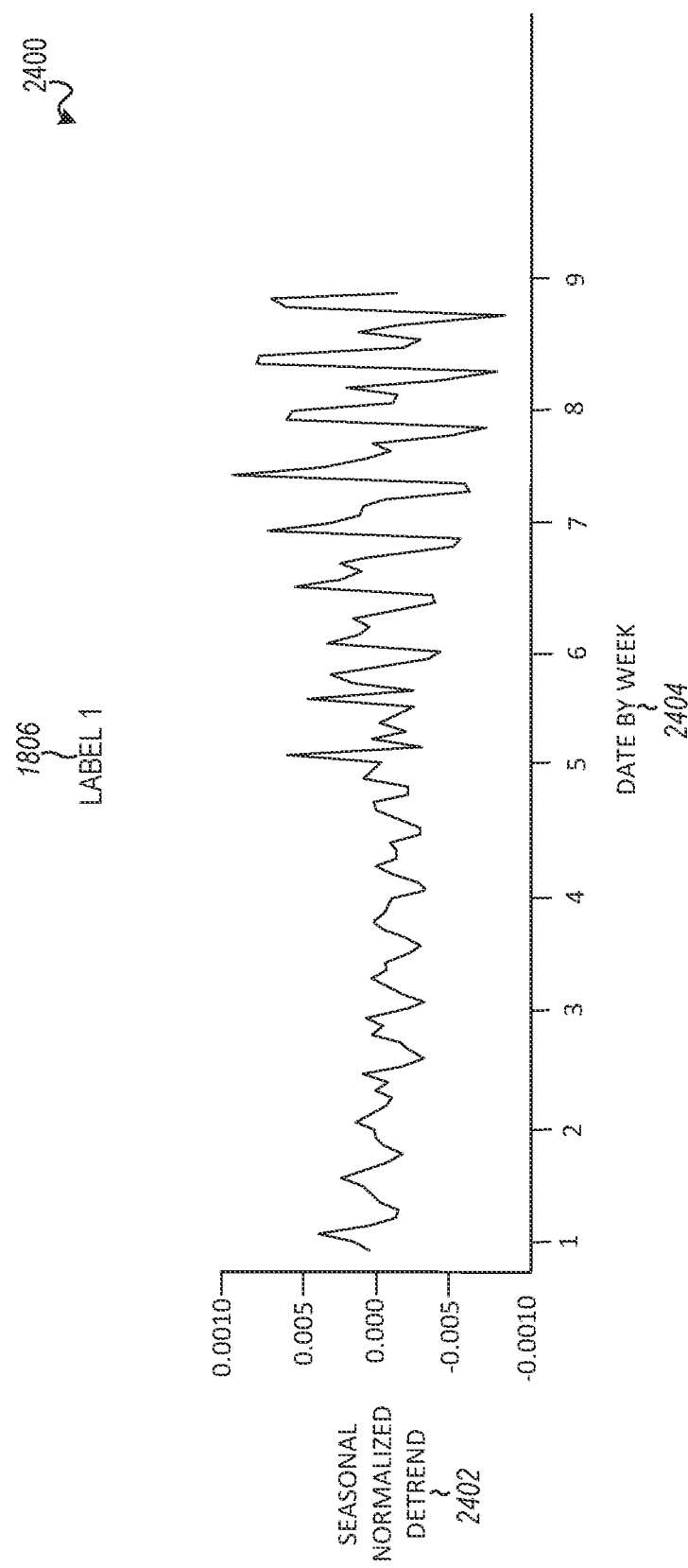
FIG. 24 illustrates graph of seasonal normalized detrend of label 1, in accordance with some embodiments

FIG. 24 illustrates graph 2400 of seasonal normalized detrend of label 1 1806, in accordance with some embodiments. Illustrated in FIG. 24 is seasonal normalized detrend 2402 along a vertical axis and date by week 2404 along a horizontal axis. Adjust engagement scores module 624 determines values for seasonal normalized detrend 2402 for label 1 1806 based on Equations (10)-(13) using the raw data 1814 of FIG. 18. Equation (10): $DT_m^l(d_k,w) = \{$detrend$_m^l(d_i) | \psi(d_i) = \psi(d_j) \wedge d_i \notin [d_{k-w}, d_k] \wedge d_i \geq d_0\}$, where $\psi(d_i)$ refers to the weekday in data $d_i$, w is the time-window size, and m is content consumption metric 1404 or the aggregate content consumption metric 1420. In FIG. 24, w=28 and seasonality period (SP)=7, which is per weekday. Equation (11): $s_m^l(d_k, w) = \text{avg}(DT_m^l(d_k, w))$, where s stands for seasonal.

$$\text{if } \sum_{i=k-w+1}^{k} s_m^l(d_k, w) \neq 0, \quad \text{Equation (12)}$$

then seasonality component = Equation (13).

$$s_m^l(d_k, w) = s_m^l(d_k, w) - \frac{\sum_{i=k-w+1}^{k} s_m^l(d_k, w)}{w}. \quad \text{Equation (13)}$$

Figure 25:
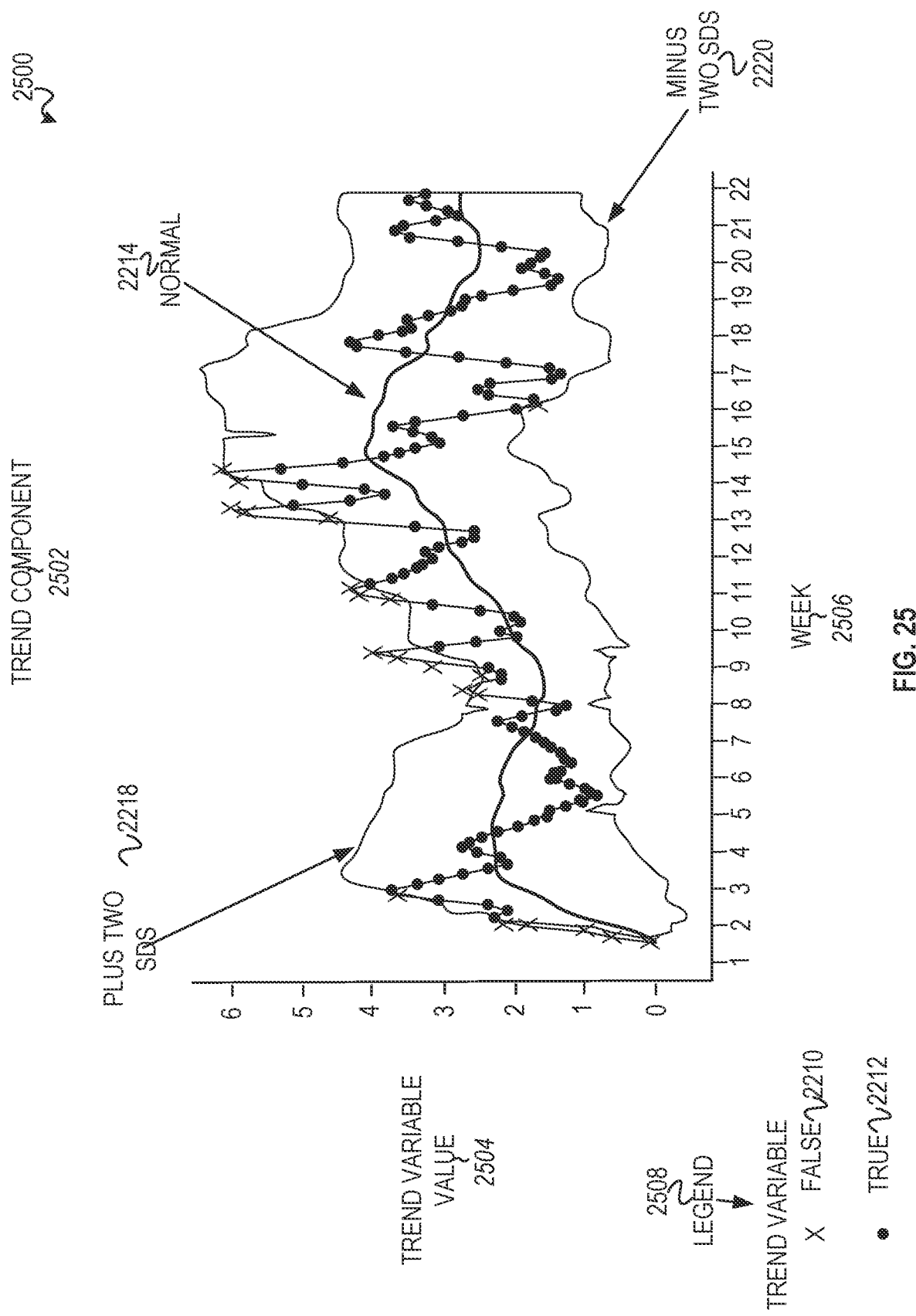
FIG. 25 illustrates graph of a trend component of popularity of label 1, in accordance with some embodiments.

FIGS. 25-29 illustrates analyzing time series of adjusted engagement scores 1704 of an aggregate content consumption metric 1420 of popularity. FIG. 25 illustrates graph 2500 of a trend component 2502 of popularity of label 1, in accordance with some embodiments. Adjust engagement scores module 624 determines trend variable value 2504 by week 2506 for label 1 1806 based on Equation (4) for the popularity of label 1. Adjust engagement scores module 624 determines the trend variable values 2504 based on Equation (4) and Equation 7), in accordance with some embodiments.

Equation (14) and Equation (15) define a normality range and a trending range, respectively. Equation (14): Normality Range: average (s)−threshold*standard deviation (s)<trend variable score<average(s)+threshold*standard deviation(s). Equation (15): Trending Range: variable score<average(s)−threshold*standard deviation(s); OR, variable score>average(s)+threshold*standard deviation(s). In some embodiments, instead of using average and standard deviation, normality and trending ranges are based on the 25th percentile (Q1) and the 75th percentile (Q3), such as Normality Range: Q1(s)−threshold*IQR (s)<trend variable score<Q3(s)+threshold*IQR(s), where IQR(s)=Q3(s)−Q1(s). Equation (15): Trending Range: variable score< Q1(s)−threshold*IQR(s); OR, variable score>Q3(s)+threshold*IQR(s).

Illustrated in FIG. 25 is minus two standard deviations (SDS) 2220, which is determined with the first portion of Equation (15) where the threshold is two. The plus two SDS 2218 is determined with second portion of Equation (15) where the threshold is two. In some embodiments, the normal 2214 is an average value of trend variable (TV) for the date range in weeks 2506. It will be appreciated that normal 2214 may be determined in other ways.

The legend 2508 indicates categories for TV values 2504 as being false 2210 or true 2212. False 2210 indicates the TV value 2504 is less than the minus two SDS 2220 or greater than plus two SDS 2218, or that the TV value 2504 is within the normality range of Equation (14). True 2212 indicates the TV value 2504 is less than the minus two SDS 2220 or TV value 2504 is greater than plus two SDS 2218; or, that TV value 2504 is within the trending range defined in Equation (15).

Figure 26:
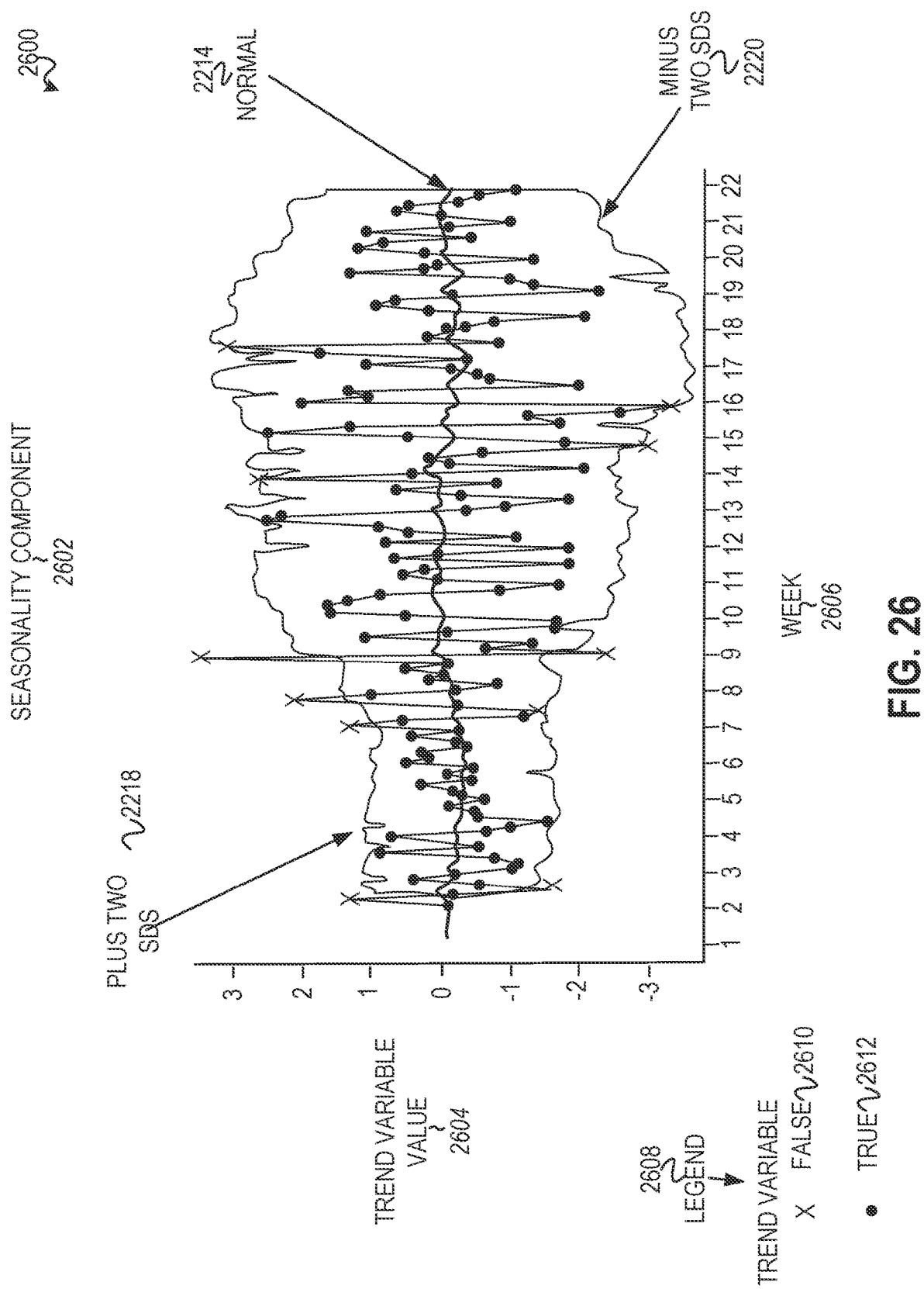
FIG. 26 illustrates graph of a seasonality component of popularity of label 1, in accordance with some embodiments.

FIG. 26 illustrates graph 2600 of a seasonality component 2602 of popularity of label 1, in accordance with some embodiments. Adjust engagement scores module 624 determines trend variable values 2604 by week 2606 for label 1 1806 based on Equations (10)-(13) using the raw data 1814 of FIG. 18. Adjust engagement scores module 624 determines the trend variable values 2604 based on Equation (4), in accordance with some embodiments. For example, the trend variable values 2604 may be determined from Equation (7). The legend 2608 indicates categories for TV values 2604 as being false 2610 or true 2612. False 2610 indicates the TV value 2604 is less than the minus two SDS 2220 or greater than plus two SDS 2218, or that the TV value 2604 is within the normality range of Equation (14). True 2612 indicates the TV value 2604 is less than the minus two SDS 2220 or TV value 2604 is greater than plus two SDS 2218; or, that TV value 2604 is within the trending range defined in Equation (15).

Figure 27:
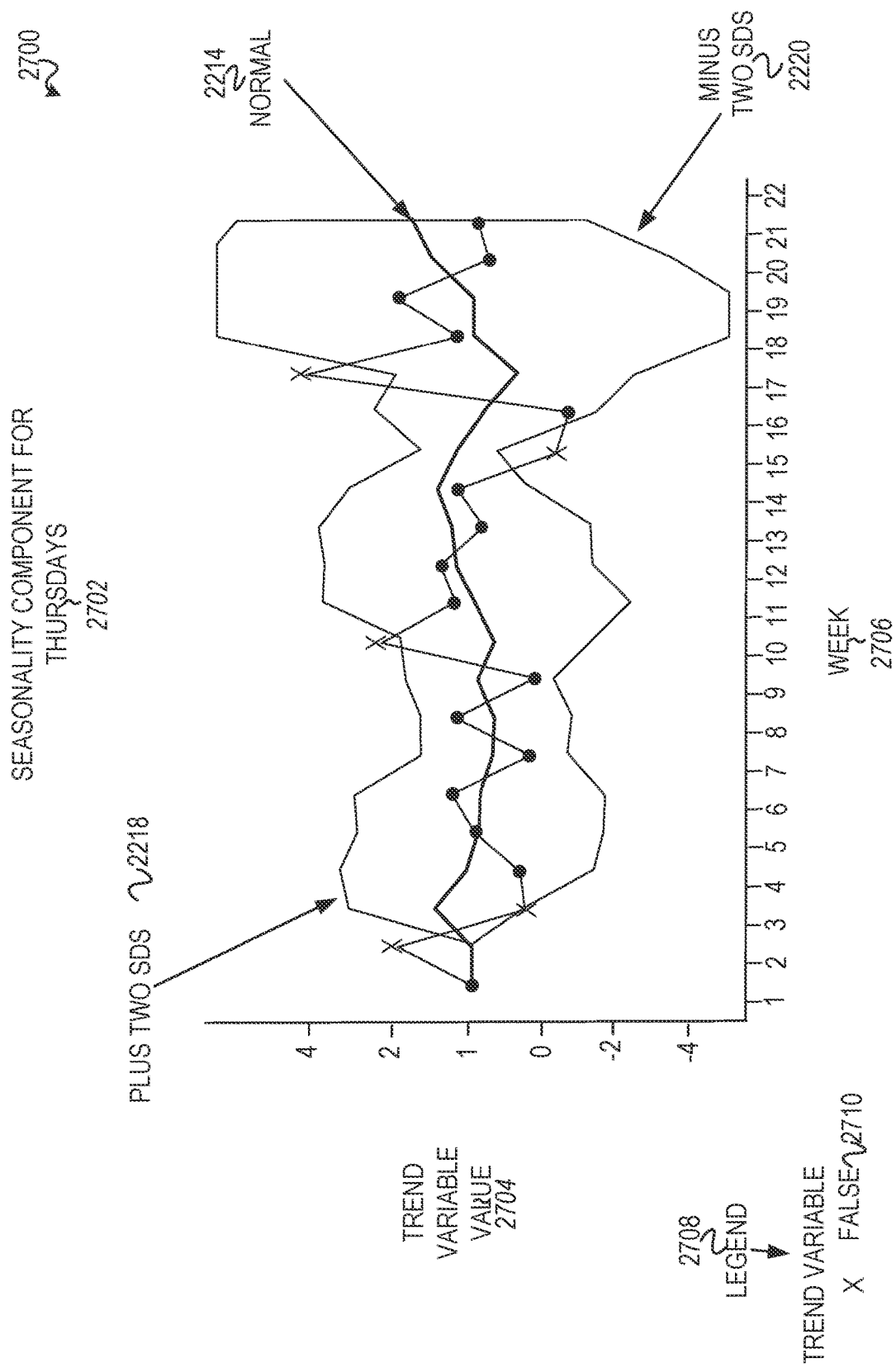
FIG. 27 illustrates graph of a seasonality component for Thursdays of popularity of label 1, in accordance with some embodiments.

FIG. 27 illustrates graph 2700 of a seasonality component for Thursdays 2702 of popularity of label 1, in accordance with some embodiments. Adjust engagement scores module 624 determines trend variable values 2704 by week 2706 for label 1 1806 based on Equations (10)-(13) using the raw data 1814 of FIG. 18. Adjust engagement scores module 624 determines the trend variable values 2704 based on Equation (4), in accordance with some embodiments. For example, the trend variable values 2604 may be determined from Equation (7). The legend 2708 indicates categories for TV values 2704 as being false 2710 or true 2712. False 2710 indicates the TV value 2704 is less than the minus two SDS 2220 or greater than plus two SDS 2218, or that the TV value 2704 is within the normality range of Equation (14). True 2612 indicates the TV value 2704 is less than the minus two SDS 2220 or TV value 2704 is greater than plus two SDS 2218; or, that TV value 2704 is within the trending range defined in Equation (15).

Figure 28:
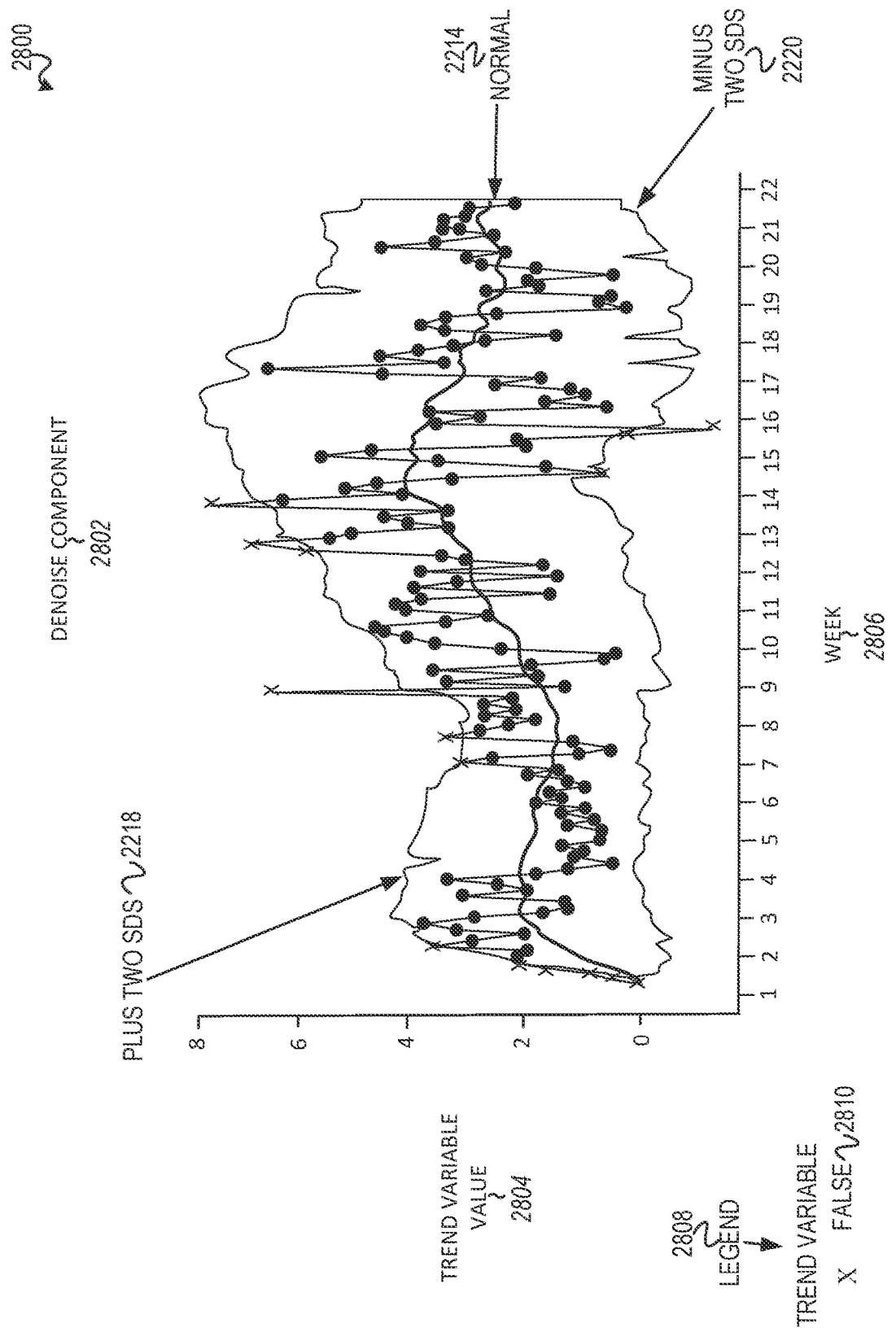
FIG. 28 illustrates graph of a denoise component of popularity of label 1, in accordance with some embodiments.

FIG. 28 illustrates graph 2800 of a denoise component 2802 of popularity of label 1, in accordance with some embodiments. Adjust engagement scores module 624 determines trend variable values 2804 by week 2806 for label 1 1806 based on Equation (16) using the raw data 1814 of FIG. 18. Equation (16): raw−residual=trend+seasonality. The legend 2808 indicates categories for TV values 2804 as being false 2810 or true 2812. False 2810 indicates the TV value 2804 is less than the minus two SDS 2220 or greater than plus two SDS 2218, or that the TV value 2804 is within the normality range of Equation (14). True 2812 indicates the TV value 2804 is less than the minus two SDS 2220 or TV value 2804 is greater than plus two SDS 2218; or, that TV value 2804 is within the trending range defined in Equation (15).

Figure 29:
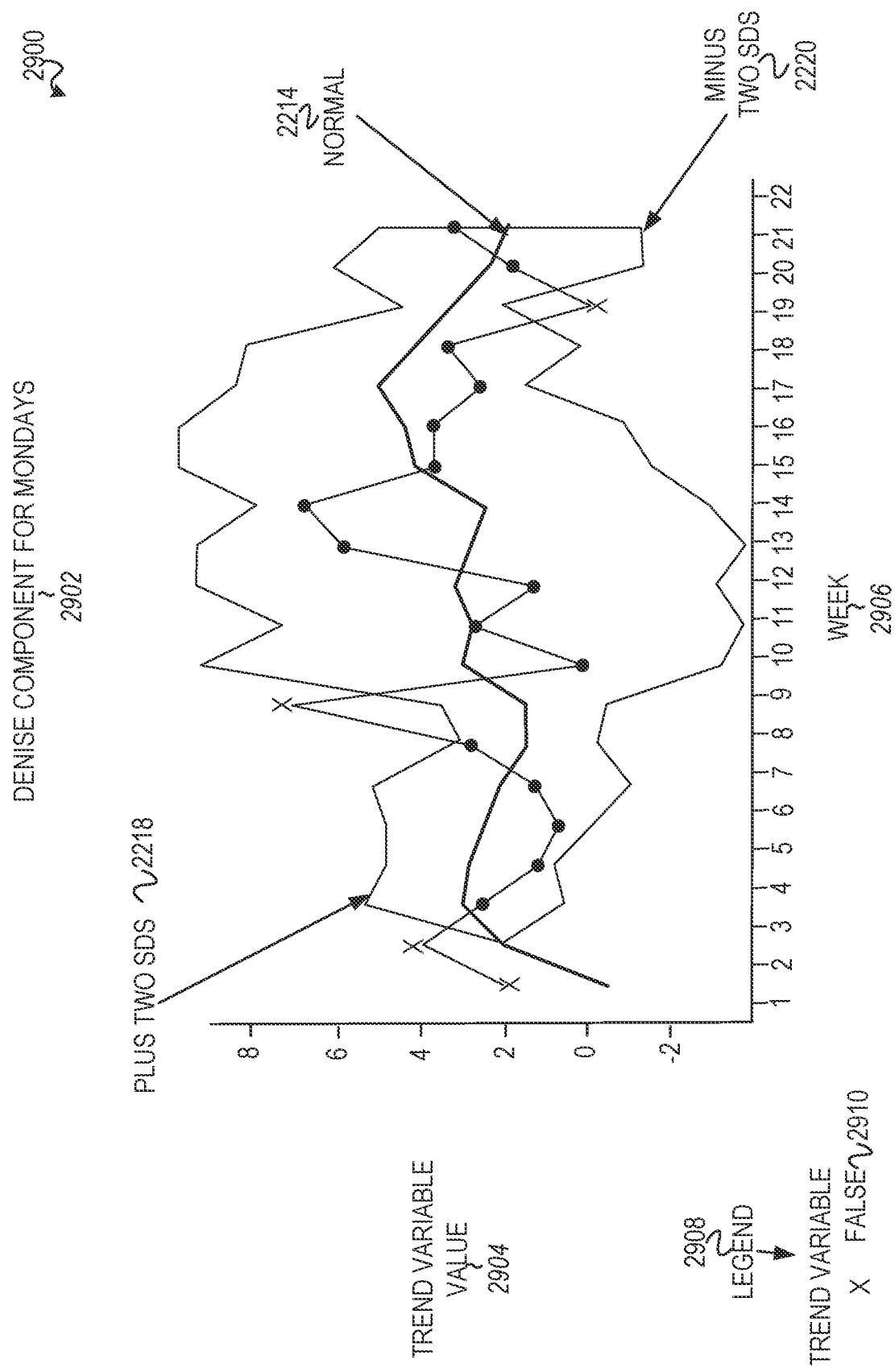
FIG. 29 illustrates graph of a denoise component for Mondays of popularity of label 1, in accordance with some embodiments.

FIG. 29 illustrates graph 2900 of a denoise component for Mondays 2902 of popularity of label 1, in accordance with some embodiments. Adjust engagement scores module 624 determines trend variable values 2904 by week 2906 for label 1 1806 based on Equation (16) using the raw data 1814 of FIG. 18. The legend 2908 indicates categories for TV values 2904 as being false 2910 or true 2912. False 2910 indicates the TV value 2904 is less than the minus two SDS 2220 or greater than plus two SDS 2218, or that the TV value 2904 is within the normality range of Equation (14). True 2912 indicates the TV value 2904 is less than the minus two SDS 2220 or TV value 2904 is greater than plus two SDS 2218; or, that TV value 2904 is within the trending range defined in Equation (15).

Figure 30:
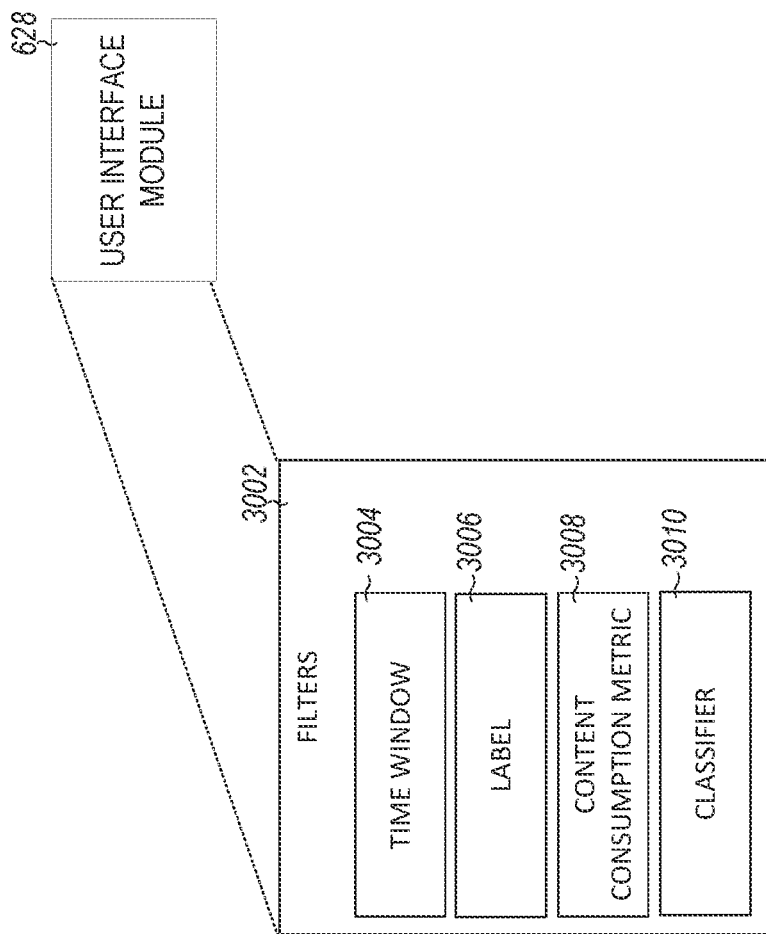
FIG. 30 illustrates user interface module, in accordance with some embodiments.

FIG. 30 illustrates user interface module 628, in accordance with some embodiments. The user interface module 628 presents a menu for a user to select values for filters 3002. The filters 3002 include time window 3004, label 3006, content consumption metric 3008, and classifier 3010. For example, to have graph 1800 presented on a display, the user selects as the classifier 3010 "raw data"; the user selects as the label 3006 one or more of label 1806, label 2 1808, label 3 1810, and label 4 1812; the user selects as the content consumption metric 3008 the content consumption metric of FIG. 18.

Figure 31:
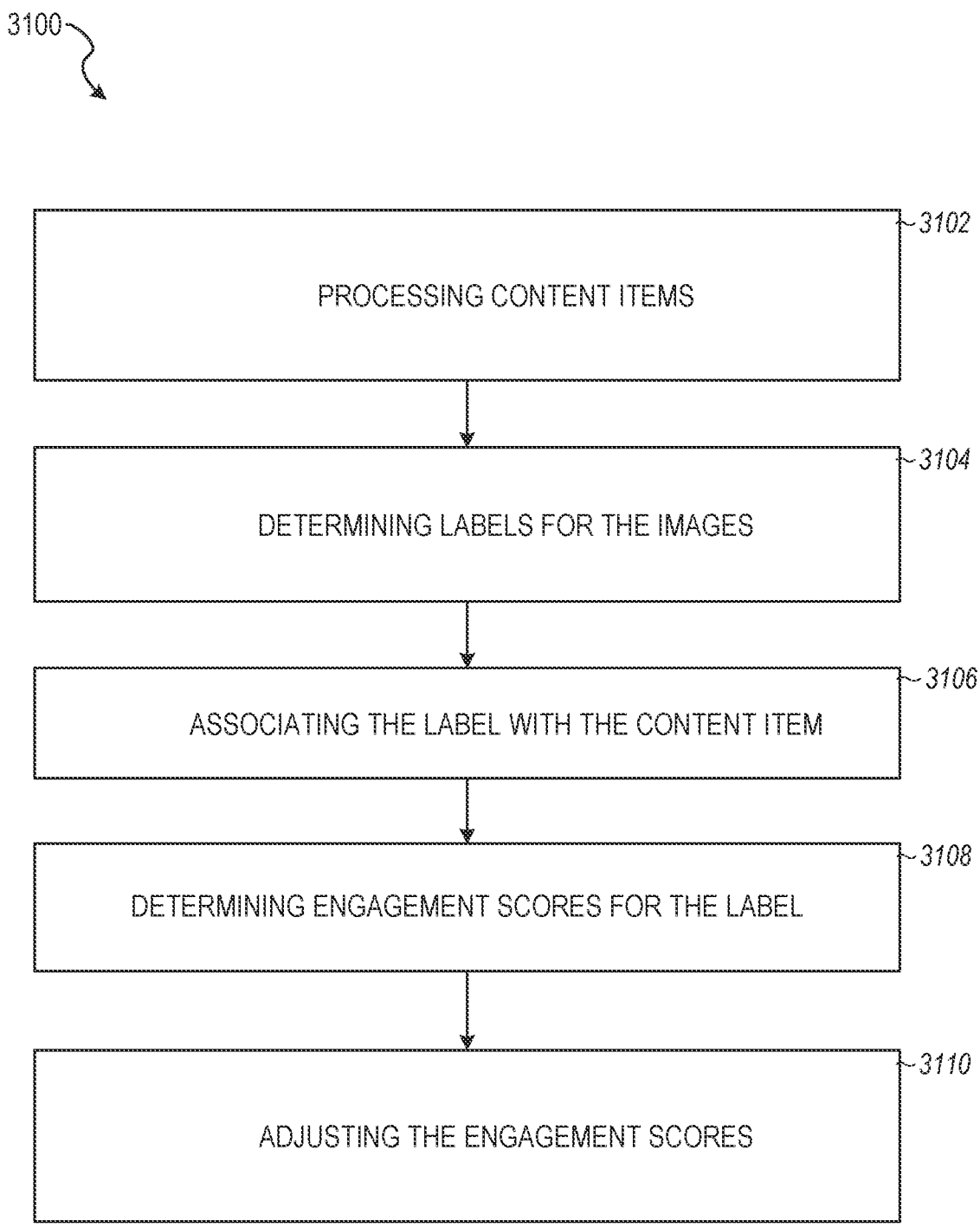
FIG. 31 illustrates a method 3100 for engagement analysis based on labels, in accordance with some embodiments.

FIG. 31 illustrates a method 3100 for engagement analysis based on labels, in accordance with some embodiments. The method 3100 begins at operation 3102 with processing content items. Operation 3102 may include processing content items including images to identify elements in the images. For example, content item analysis module 902 of FIG. 9 processes the content items 602 that includes images 708 and video 710 based on element descriptors 918 to generate elements 726.

The method 3100 continues at operation 3104 with determining labels for the images.

In some embodiments operation 3104 include determining labels for the images based on conditions indicating when to associate a label of the labels with an image of the images based on the elements in the image. For example, labels extraction module 610 of FIG. 9 determines labels 914 to content items 602 based on elements 726 identified in the content items 602.

The method 3100 continues at operation 3106 with associating the label with the content item. In some embodiments operation 3106 includes in response to determining to associate the label with the image, associating the label with the content item. For example, continuing with the example of operation 3104, the labels extraction module 610 stores an association between the content item 602 and label 914 in labels database 614.

The method 3100 continues at operation 3108 with determining engagement scores for the label. In some embodiments operation 3108 includes determining engagement scores for the label based on interactions of users with the content items associated with label. For example, determine engagement scores module 622 of FIG. 14 determines engagement scores 1408.

The method 3100 continues at operation 3110 with adjusting the engagement scores. In some embodiments operation 3110 includes adjusting the engagement scores to determine trends in the labels to generate adjusted engagement scores.

For example adjust engagement scores module 624 adjusts the engagement scores 1408 and generates adjusted engagement scores 1704.

One or more of the operations of method 3100 may be optional. Method 3100 may include one or more additional operations. The operations of method 3100 may be performed in a different order. The machine 3200 or an apparatus of the machine 3200 is configured to perform method 3100 and other methods disclosed herein, in accordance with some embodiments.

Machine Architecture

Figure 32:
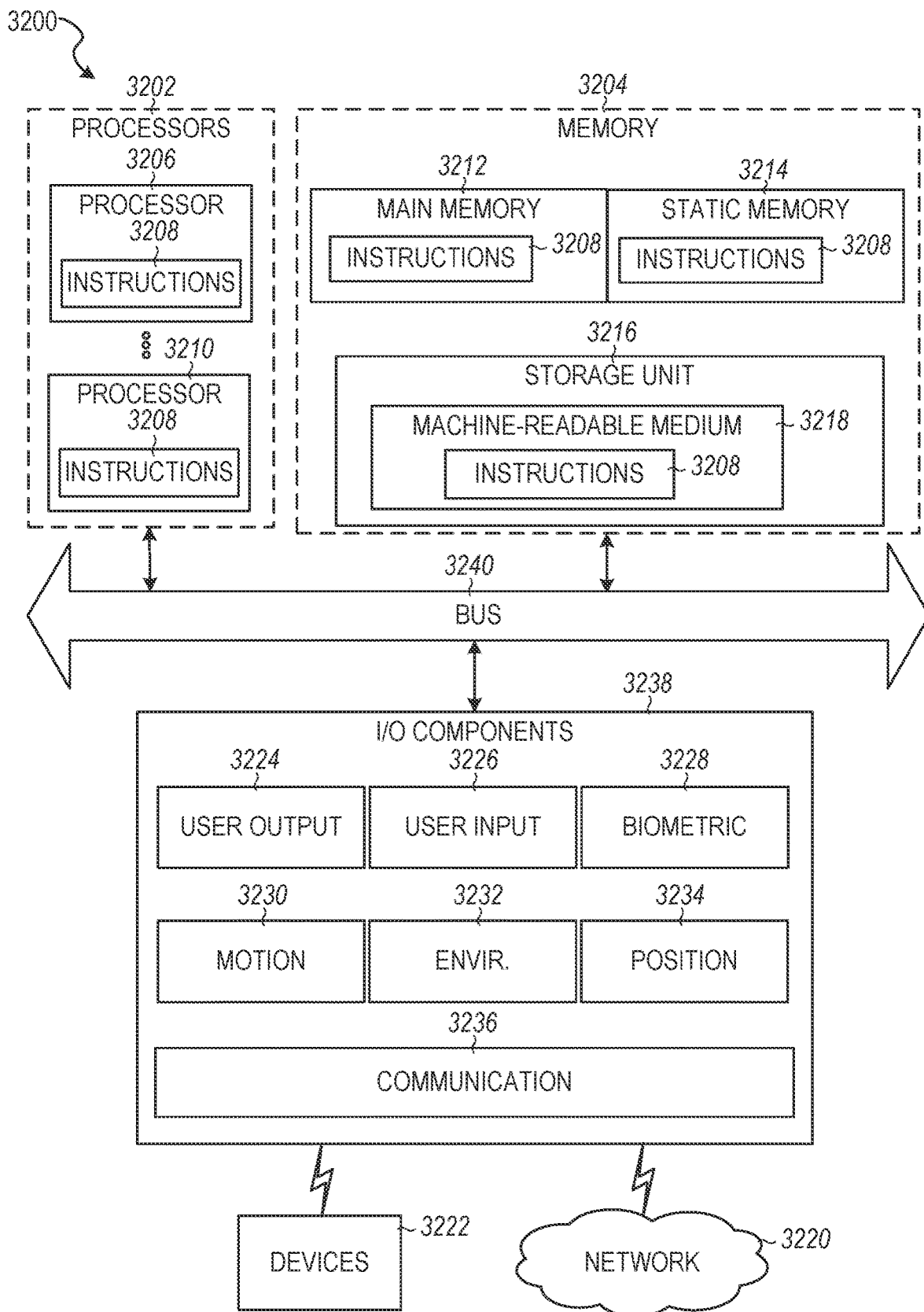
FIG. 32 is a diagrammatic representation of a machine in the form of a computer system within which a set of instructions may be executed for causing the machine to perform any one or more of the methodologies discussed herein, in accordance with some examples.

FIG. 32 is a diagrammatic representation of the machine 3200 within which instructions 3208 (e.g., software, a program, an application, an applet, an app, or other executable code) for causing the machine 3200 to perform any one or more of the methodologies discussed herein may be executed. For example, the instructions 3208 may cause the machine 3200 to execute any one or more of the methods described herein. The instructions 3208 transform the general, non-programmed machine 3200 into a particular machine 3200 programmed to carry out the described and illustrated functions in the manner described. The machine 3200 may operate as a standalone device or may be coupled (e.g., networked) to other machines. In a networked deployment, the machine 3200 may operate in the capacity of a server machine or a client machine in a server-client network environment, or as a peer machine in a peer-to-peer (or distributed) network environment. The machine 3200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 3208, sequentially or otherwise, that specify actions to be taken by the machine 3200. Further, while only a single machine 3200 is illustrated, the term "machine" shall also be taken to include a collection of machines that individually or jointly execute the instructions 3208 to perform any one or more of the methodologies discussed herein. The machine 3200, for example, may comprise the client device 102 or any one of a number of server devices forming part of the messaging server system 108. In some examples, the machine 3200 may also comprise both client and server systems, with certain operations of a particular method or algorithm being performed on the server-side and with certain operations of the particular method or algorithm being performed on the client-side.

The machine 3200 may include processors 3202, memory 3204, and input/output I/O components 3238, which may be configured to communicate with each other via a bus 3240. The processors 3202 may be termed computer processors, in accordance with some embodiments. In an example, the processors 3202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 3206 and a processor 3210 that execute the instructions 3208. The term "processor" is intended to include multi-core processors that may comprise two or more independent processors (sometimes referred to as "cores") that may execute instructions contemporaneously. Although FIG. 32 shows multiple processors 3202, the machine 3200 may include a single processor with a single-core, a single processor with multiple cores (e.g., a multi-core processor), multiple processors with a single core, multiple processors with multiples cores, or any combination thereof.

The memory 3204 includes a main memory 3212, a static memory 3214, and a storage unit 3216, both accessible to the processors 3202 via the bus 3240. The main memory 3204, the static memory 3214, and storage unit 3216 store the instructions 3208 embodying any one or more of the methodologies or functions described herein. The instructions 3208 may also reside, completely or partially, within the main memory 3212, within the static memory 3214, within machine-readable medium 3218 within the storage unit 3216, within at least one of the processors 3202 (e.g., within the Processor's cache memory), or any suitable combination thereof, during execution thereof by the machine 3200.

The I/O components 3238 may include a wide variety of components to receive input, provide output, produce output, transmit information, exchange information, capture measurements, and so on. The specific I/O components 3238 that are included in a particular machine will depend on the type of machine. For example, portable machines such as mobile phones may include a touch input device or other such input mechanisms, while a headless server machine will likely not include such a touch input device. It will be appreciated that the I/O components 3238 may include many other components that are not shown in FIG. 32. In various examples, the I/O components 3238 may include user output components 3224 and user input components 3226. The user output components 3224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 3226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 3238 may include biometric components 3228, motion components 3230, environmental components 3232, or position components 3234, among a wide array of other components. For example, the biometric components 3228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 3230 include acceleration sensor components (e.g., accelerometer), gravitation sensor components, rotation sensor components (e.g., gyroscope).

The environmental components 3232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 3234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3238 further include communication components 3236 operable to couple the machine 3200 to a network 3220 or devices 3222 via respective coupling or connections. For example, the communication components 3236 may include a network interface Component or another suitable device to interface with the network 3220. In further examples, the communication components 3236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 3222 may be another machine or any of a wide variety of peripheral devices (e.g., a peripheral device coupled via a USB).

Moreover, the communication components 3236 may detect identifiers or include components operable to detect identifiers. For example, the communication components 3236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 3236, such as location via Internet Protocol (IP) geolocation, location via Wi-Fi® signal triangulation, location via detecting an NFC beacon signal that may indicate a particular location, and so forth.

The various memories (e.g., main memory 3212, static memory 3214, and memory of the processors 3202) and storage unit 3216 may store one or more sets of instructions and data structures (e.g., software) embodying or used by any one or more of the methodologies or functions described herein. These instructions (e.g., the instructions 3208), when executed by processors 3202, cause various operations to implement the disclosed examples.

The instructions 3208 may be transmitted or received over the network 3220, using a transmission medium, via a network interface device (e.g., a network interface component included in the communication components 3236) and using any one of several well-known transfer protocols (e.g., hypertext transfer protocol (HTTP)). Similarly, the instructions 3208 may be transmitted or received using a transmission medium via a coupling (e.g., a peer-to-peer coupling) to the devices 3222.

Software Architecture

Figure 33:
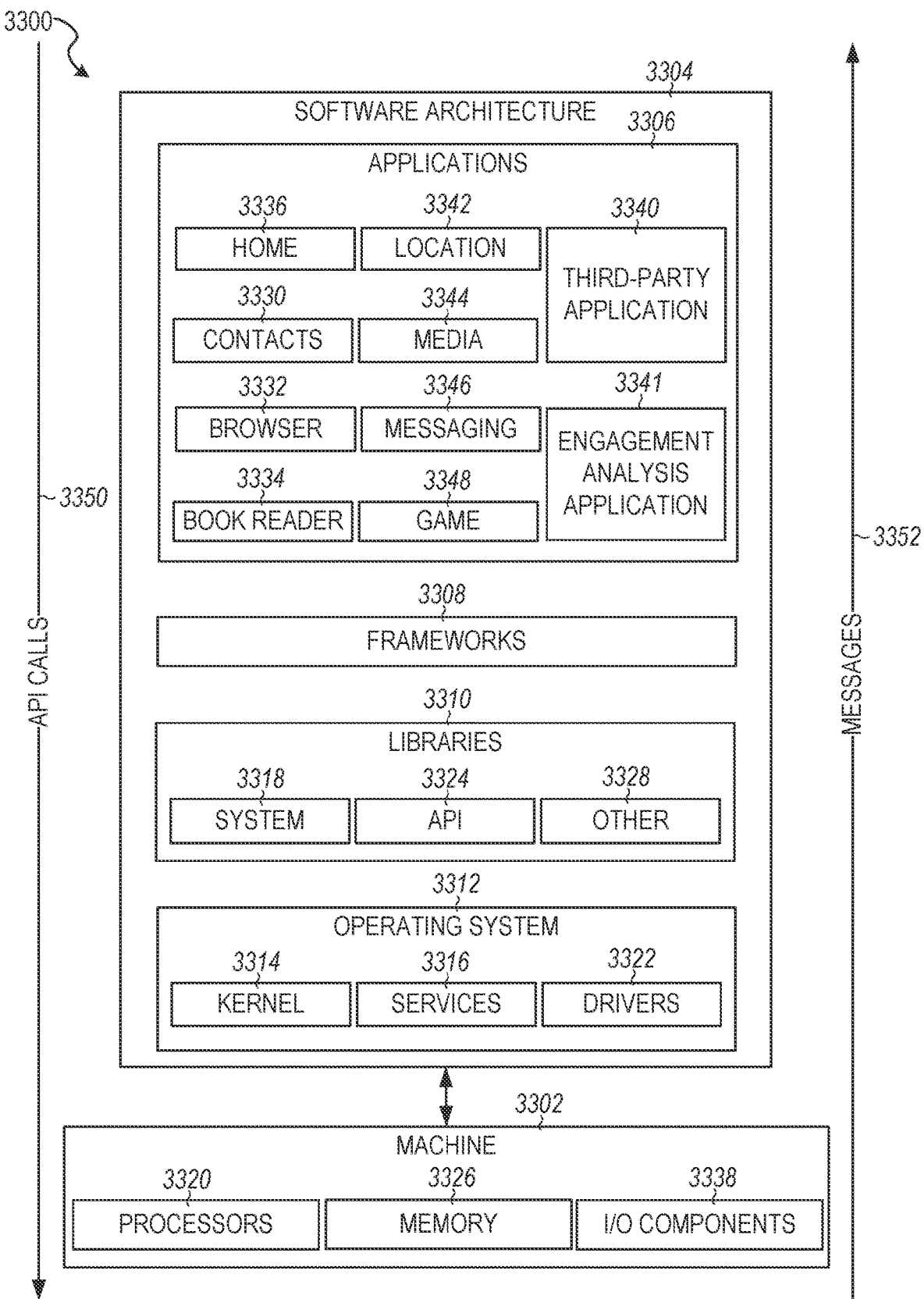
FIG. 33 is a block diagram showing a software architecture within which examples may be implemented.

FIG. 33 is a block diagram 3300 illustrating a software architecture 3304, which can be installed on any one or more of the devices described herein. The software architecture 3304 is supported by hardware such as a machine 3302 that includes processors 3320, memory 3326, and I/O components 3338. In this example, the software architecture 3304 can be conceptualized as a stack of layers, where each layer provides a particular functionality. The software architecture 3304 includes layers such as an operating system 3312, libraries 3310, frameworks 3308, and applications 3306. Operationally, the applications 3306 invoke API calls 3350 through the software stack and receive messages 3352 in response to the API calls 3350.

The operating system 3312 manages hardware resources and provides common services. The operating system 3312 includes, for example, a kernel 3314, services 3316, and drivers 3322. The kernel 3314 acts as an abstraction layer between the hardware and the other software layers. For example, the kernel 3314 provides memory management, processor management (e.g., scheduling), component management, networking, and security settings, among other functionality. The services 3316 can provide other common services for the other software layers. The drivers 3322 are responsible for controlling or interfacing with the underlying hardware. For instance, the drivers 3322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 3310 provide a common low-level infrastructure used by the applications 3306. The libraries 3310 can include system libraries 3318 (e.g., C standard library) that provide functions such as memory allocation functions, string manipulation functions, mathematic functions, and the like. In addition, the libraries 3310 can include API libraries 3324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 3310 can also include a wide variety of other libraries 3328 to provide many other APIs to the applications 3306.

The frameworks 3308 provide a common high-level infrastructure that is used by the applications 3306. For example, the frameworks 3308 provide various graphical user interface (GUI) functions, high-level resource management, and high-level location services. The frameworks 3308 can provide a broad spectrum of other APIs that can be used by the applications 3306, some of which may be specific to a particular operating system or platform.

In an example, the applications 3306 may include a home application 3336, a contacts application 3330, a browser application 3332, a book reader application 3334, an engagement analysis application 3341, a location application 3342, a media application 3344, a messaging application 3346, a game application 3348, and a broad assortment of other applications such as a third-party application 3340. The engagement analysis application 3341 may be the same or similar as the system 600 disclosed in conjunction with FIG. 6 and herein. The applications 3306 are programs that execute functions defined in the programs. Various programming languages can be employed to create one or more of the applications 3306, structured in a variety of manners, such as object-oriented programming languages (e.g., Objective-C, Java, or C++) or procedural programming languages (e.g., C or assembly language). In a specific example, the third-party application 3340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 3340 can invoke the API calls 3350 provided by the operating system 3312 to facilitate functionality described herein.

Processing Components

Figure 34:
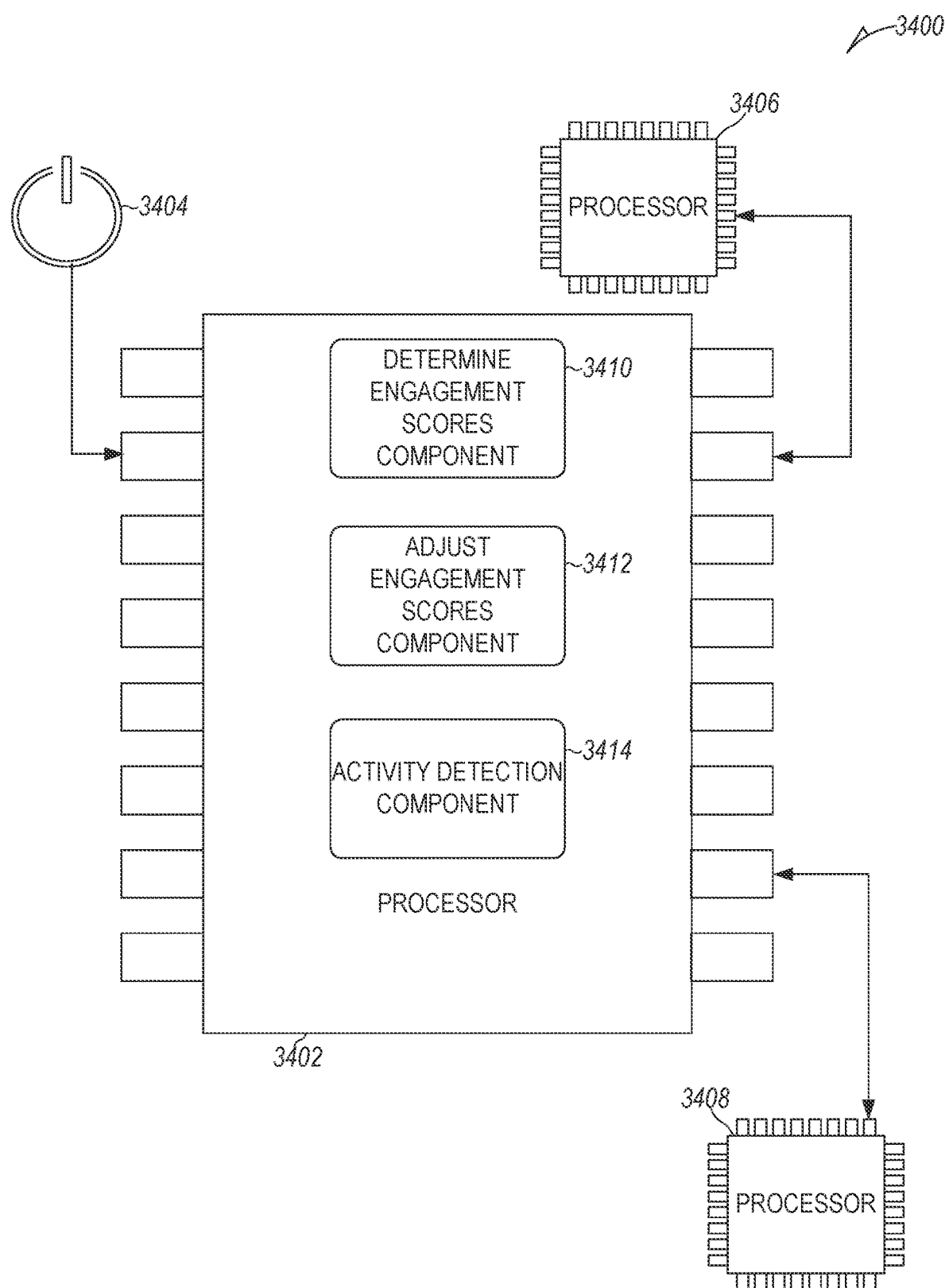
FIG. 34 is a diagrammatic representation of a processing environment, in accordance with some examples.

Turning now to FIG. 34, there is shown a diagrammatic representation of a processing environment 3400, which includes a processor 3402, a processor 3406, and a processor 3408 (e.g., a GPU, CPU or combination thereof). The processor 3402 is shown to be coupled to a power source 3404, and to include (either permanently configured or temporarily instantiated) modules, namely a determine engagement scores component 3410, an adjust engagement scores component 3412, and an activity detection component 3414. Referring to FIGS. 14 and 17, the determine engagement scores component 3410 operationally generates engagement scores 1408; the adjust engagement scores component 3412 operationally generates adjusted engagement scores 1704; and, the activity detection component 3414 operationally generates actions 1702. As illustrated, the processor 3402 is communicatively coupled to both the processor 3406 and the processor 3408.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 3202 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A system comprising:
   one or more processors; and
   one or more memories storing instructions that, when executed by the one or more processors, cause the system to perform operations comprising:
   processing images to identify elements in the images;
   associating labels with the images based on one or more conditions indicating when to associate labels with images based on the elements identified in the images;
   determining engagement scores for the labels based on interactions of users with the images associated with the labels;
   adjusting the engagement scores to determine a dynamic seasonality for an interaction of the interactions of the users, the dynamic seasonality based on an average of subtracting a trend component from values of the interaction;
   in response to determining that an engagement score of the adjusted engagement scores for a label of the labels transgresses a threshold value, recommending images associated with the label to users of an interaction platform, and generating augmentations based on the label for the recommended images, the augmentations comprising at least one of stickers, captions, or songs; and
   providing the generated augmentations to the users.

2. The system of claim 1, wherein the operations further comprise:
   in response to determining that the adjusted engagement score of the adjusted engagement scores is in a normality range, generating content items associated with the label or generating a report indicating the label and the adjusted engagement score.

3. The system of claim 2, wherein the operations further comprise:
   causing the report to be displayed by a computer.

4. The system of claim 1, wherein the operations further comprise:
   causing the adjusted engagement scores to be displayed on a display of a computer.

5. The system of claim 1, wherein the operations further comprise:
   storing the interactions of the users with the images.

6. The system of claim 1, wherein in response to determining to associate the label with the images further comprises:
   associating ancestors of the label within a hierarchy of labels with the images.

7. The system of claim 1, wherein the interactions of the users with the images comprises a plurality of content consumption metrics, and wherein the operations further comprise:
   determining a passion as an engagement score for the label based on multiplying a weight of a plurality of weights with a corresponding content consumption metric of the plurality of content consumption metrics.

8. The system of claim 7 wherein the plurality of weights is a first plurality of weights and wherein the operations further comprise:
determining a popularity as an engagement score for the label based on multiplying a weight of a second plurality of weights with a corresponding content consumption metric of the plurality of content consumption metrics.

9. The system of claim 1 further comprising:
adjusting the adjusted engagement scores to determine a trend momentum (TM), the TM based on subtracting a first simple moving average (SMA) with a first window from a second SMA with a second window, wherein the second window is shorter than the first window.

10. The system of claim 1, wherein the images are generated by client devices associated with the users.

11. The system of claim 1, wherein the elements comprise objects, scenes, and actions.

12. The system of claim 1, wherein metadata is associated with the images, and wherein the one or more conditions are further based on the metadata.

13. The system of claim 12, wherein the one or more conditions are further based on augmentations added to the images.

14. The system of claim 1 wherein an element of the elements is identified based on using a convolution neural network trained to identify the element.

15. The system of claim 1 further comprising:
determining the interactions of users based on a date range.

16. A non-transitory storage medium comprising instructions that, when executed by one or more processors of a system, cause the system to perform operations, the operations comprising:
processing images to identify elements in the images;
associating labels with the images based on one or more conditions indicating when to associate labels with images based on the elements identified in the images;
determining engagement scores for the labels based on interactions of users with the images associated with the labels;
adjusting the engagement scores to determine a dynamic seasonality for an interaction of the interactions of the users, the dynamic seasonality based on an average of subtracting a trend component from values of the interaction;
in response to determining that an engagement score of the adjusted engagement scores for a label of the labels transgresses a threshold value, recommending images associated with the label to users of an interaction platform, and generating augmentations based on the label for the recommended images, the augmentations comprising at least one of stickers, captions, or songs; and
providing the generated augmentations to the users.

17. The non-transitory storage medium of claim 16, wherein the operations further comprise:
in response to determining that the adjusted engagement score of the adjusted engagement scores is in a normality range, generating content items associated with the label or generating a report indicating the label and the adjusted engagement score.

18. The non-transitory storage medium of claim 16, wherein in response to determining to associate the label with the images further comprises:
associating ancestors of the label within a hierarchy of labels with the images.

19. A method performed on a computer, the method comprising:
processing images to identify elements in the images;
associating labels with the images based on one or more conditions indicating when to associate labels with images based on the elements identified in the images;
determining engagement scores for the labels based on interactions of users with the images associated with the labels;
adjusting the engagement scores to determine a dynamic seasonality for an interaction of the interactions of the users, the dynamic seasonality based on an average of subtracting a trend component from values of the interaction;
in response to determining that an engagement score of the adjusted engagement scores for a label of the labels transgresses a threshold value, recommending images associated with the label to users of an interaction platform, and generating augmentations based on the label for the recommended images, the augmentations comprising at least one of stickers, captions, or songs; and
providing the generated augmentations to the users.

20. The method of claim 19, wherein the method further comprises:
in response to determining that the adjusted engagement score of the adjusted engagement scores is in a normality range, generating content items associated with the label or generating a report indicating the label and the adjusted engagement score.

* * * * *